US012730263B2

(12) United States Patent
Patri et al.

(10) Patent No.: US 12,730,263 B2
(45) Date of Patent: Sep. 8, 2026

(54) METHOD AND DEVICES FOR EFFICIENT MANIPULATION OF LIGHT USING WAVEGUIDE SCATTERER ARRAYS

(71) Applicants: Ashutosh Patri, Outremont (CA); Stephane Kena-Cohen, Montreal (CA)

(72) Inventors: Ashutosh Patri, Outremont (CA); Stephane Kéna-Cohen, Montreal (CA); Christophe Caloz, Leuven (BE)

(73) Assignees: Ashutosh Patri, Montreal (CA); Stephane Kena-Cohen, Montreal (CA)

( * ) Notice: Subject to any disclaimer, the term of this patent is extended or adjusted under 35 U.S.C. 154(b) by 329 days.

(21) Appl. No.: 17/631,699

(22) PCT Filed: Jul. 30, 2020

(86) PCT No.: PCT/CA2020/051046
§ 371 (c)(1),
(2) Date: Jan. 31, 2022

(87) PCT Pub. No.: WO2021/016714
PCT Pub. Date: Feb. 4, 2021

(65) Prior Publication Data

US 2022/0268999 A1 Aug. 25, 2022

Related U.S. Application Data

(60) Provisional application No. 62/880,333, filed on Jul. 30, 2019.

(51) Int. Cl.
*G02B 6/124* (2006.01)
*G02B 1/00* (2006.01)
(Continued)

(52) U.S. Cl.
CPC ................ *G02B 6/124* (2013.01); *G02B 5/18* (2013.01); *G02B 2006/12061* (2013.01);
(Continued)

(58) Field of Classification Search
CPC ....... G02B 6/124; G02B 5/1809; G02B 1/002
See application file for complete search history.

(56) References Cited

U.S. PATENT DOCUMENTS 5,742,433 A * 4/1998 Shiono ................ G02B 5/1876 359/574
8,977,084 B2 * 3/2015 Hulsey ................ H04B 10/112 385/37

(Continued)

OTHER PUBLICATIONS

Y. Ra'Di, D. L. Sounas, and A. Alu, Metagratings: beyond the limits of graded metasurfaces for wave front control, Physical review letters, vol. 119(6), p. 067404, 2017.

(Continued)

*Primary Examiner* — Thomas A Hollweg
*Assistant Examiner* — Erin D Chiem
(74) *Attorney, Agent, or Firm* — NORTON ROSE FULBRIGHT CANADA LLP

(57) ABSTRACT

There is provided a scattering element comprising a vertically-oriented waveguide comprising one or more dielectric components configured to provide directional scattering of an incident electromagnetic wave in a pattern caused by one of interference between at least two guided components and interference between at least one guided component and at least one radiative component, the guided and radiative components excited by the incident electromagnetic wave. A grating device for transmission or reflection of incident electromagnetic waves in a desired direction, the grating device comprising an array of the scattering elements, is also provided.

20 Claims, 25 Drawing Sheets

(51) Int. Cl.

| | |
|---|---|
| ***G02B 5/18*** | (2006.01) |
| ***G02B 6/12*** | (2006.01) |
| ***G02B 6/122*** | (2006.01) |
| ***G02B 6/34*** | (2006.01) |
| ***G02B 27/00*** | (2006.01) |

(52) U.S. Cl.

CPC .............. *G02B 6/1228* (2013.01); *G02B 6/34* (2013.01); *G02B 27/0037* (2013.01)

(56) References Cited

U.S. PATENT DOCUMENTS

| | | | | |
|---|---|---|---|---|
| 11,709,318 | B1 * | 7/2023 | Jain .................... | G02B 6/12011 385/37 |
| 2006/0024013 | A1 * | 2/2006 | Magnusson ............ | G02B 6/124 385/129 |
| 2012/0183250 | A1 * | 7/2012 | Cheben ................... | G02F 1/365 385/27 |
| 2012/0224810 | A1 * | 9/2012 | Doerr ...................... | G02B 6/124 427/163.2 |
| 2012/0322177 | A1 * | 12/2012 | Pomerene .............. | H10D 86/80 257/E31.119 |
| 2017/0315387 | A1 * | 11/2017 | Watts ...................... | G02F 1/292 |
| 2018/0045953 | A1 * | 2/2018 | Fan .......................... | G02B 5/18 |
| 2019/0257986 | A1 * | 8/2019 | Paniagua Dominguez ................. | G02B 5/1847 |

OTHER PUBLICATIONS

A. Patri, G. Lavigne, and C. Caloz, Transmissive Suppressed-Order Diffraction Grating (SODG), arXiv preprint arXiv:1901.09695, p. 1-5, 2019.

Roscoe, H. E.; Schuster, A. Spectrum analysis; Macmillan, 1885.

Treacy, E. IEEE, Optical Pulse Compression With Diffraction Gratings, Journal of quantum Electronics 1969, 5, 454-458.

Dobson, S. L.; Sun, P.-C.; Fainman, Y., Diffractive lenses for chromatic confocal imaging, Applied optics 1997, 36, 4744-4748.

Brown, B.; Lohmann, A., Computer-generated Binary Holograms, IBM Journal of research and Development 1969, 13, 160-168.

Dakss, M.; Kuhn, L.; Heidrich, P.; Scott, B., Grating Coupler for Efficient Excitation of Optical Guided Waves in Thin Films, Applied physics letters 1970, 16, 523-525.

Swanson, G. J. Binary optics technology: theoretical limits on the diffraction efficiency of multilevel diffractive optical elements; Technical Report 914, Massachusetts Institute of Technology, 1991.

Loewen, E. G.; Popov, E. Diffraction gratings and applications; CRC Press, 1997.

Lalanne, P.; Astilean, S.; Chavel, P.; Cambril, E.; Launois, H., Blazed binary subwavelength gratings with efficiencies larger than those of conventional echelette gratings, Optics letters 1998, 23, 1081-1083.

Lalanne, P. Josa A, Waveguiding in blazed-binary diffractive éléments, Journal of the Optical Society of America A, 1999, 16, 2517-2520.

Lalanne, P.; Astilean, S.; Chavel, P.; Cambril, E.; Launois, H. Josa A, Design and fabrication of blazed binary diffractive elements with sampling periods smaller than the structural cutoff, Journal of the Optical Society of America A, 1999, 16, 1143-1156.

Kildishev, A. V.; Boltasseva, A.; Shalaev, V. M., Planar Photonics with Metasurfaces, Science 2013, 339, 1232009.

Kuznetsov, A. I.; Miroshnichenko, A. E.; Brongersma, M. L.; Kivshar, Y. S.; Lukyanchuk, B., Optically resonant dielectric nanostructures, Science 2016, 354, aag2472.

Achouri, K.; Caloz, C., Design, concepts, and applications of electromagnetic metasurfaces, Nanophotonics 2018, 7, 1095-1116.

Hess, O.; Pendry, J. B.; Maier, S. A.; Oulton, R. F.; Hamm, J. M.; Tsakmakidis, K. L., Active nanoplasmonic metamaterials, Nature materials 2012, 11, 573.

Sell, D.; Yang, J.; Doshay, S.; Yang, R.; Fan, J. A., Large-Angle, Multifunctional Metagratings Based on Freeform Multimode Geometries, Nano letters 2017, 17, 3752-3757.

Khaidarov, E.; Hao, H.; Paniagua-Dominguez, R.; Yu, Y. F.; Fu, Y. H.; Valuckas, V.; Yap, S. L. K.; Toh, Y. T.; Ng, J. S. K.; Kuznetsov, A. I., Asymmetric Nanoantennas for Ultrahigh Angle Broadband Visible Light Bending, Nano letters 2017, 17, 6267-6272.

Fan, Z.; Shcherbakov, M. R.; Allen, M.; Allen, J.; Wenner, B.; Shvets, G., Perfect Diffraction with Multiresonant Bianisotropic Metagratings, ACS Photonics 2018, 5, 4303-4311.

Schelkuno, S. A., A Mathematical Theory of Linear Arrays, The Bell System Technical Journal 1943, 22, 80-107.

Haupt, R. L., Antenna arrays: a computational approach; John Wiley & Sons, 2010.

Ma, C.; Zhang, Q.; Van Keuren, E., Analysis of symmetric and asymmetric nanoscale slab slot waveguides, Optics Communications 2009, 282, 324-328.

Almeida, V. R.; Xu, Q.; Barrios, C. A.; Lipson, M., Guiding and confining light in void nanostructure, Optics letters 2004, 29, 1209-1211.

Arbabi, A.; Horie, Y.; Bagheri, M.; Faraon, A., Dielectric metasurfaces for complete control of phase and polarization with subwavelength spatial resolution and high transmission, Nature nanotechnology 2015, 10, 937.

Chen, W. T.; Zhu, A. Y.; Sanjeev, V.; Khorasaninejad, M.; Shi, Z.; Lee, E.; Capasso, F., A broadband achromatic metalens for focusing and imaging in the visible, Nature nanotechnology 2018, 13, 220.

Lalanne, P.; Chavel, P., Metalenses at visible wavelengths: past, present, perspectives, Laser & Photonics Reviews 2017, 11, 1600295.

Patri, A.; Lavigne, G.; Caloz, C. Metasurface particle with independent transmission and reflection full phase coverage, 2018 IEEE International Symposium on Antennas and Propagation & USNC/URSI National Radio Science Meeting. 2018; pp. 995-996.

G. Y. Zhu, H. X. Zhou and W. Hong, A, Novel Directional Multilevel Method Using Waveguide Eigenmode Expansion, 2018 IEEE Asia-Pacific Conference on Antennas and Propagation (APCAP).

D. Taillaert, F. V. Laere, M. Ayre, W. Bogaerts, D. V. Thourhout, P. Bienstman, and R. Baets, Gratingcouplers for coupling between optical fibers and nanophotonic waveguides, Jpn. J. Appl. Phys. 45(8A),6071-6077 (2006).

J. Sarathy, R. A. Mayer, K. Jung, S. Unnikrishnan,D. L. Kwong, and J. C. Campbell, Normal-incidence grating couplers in Ge—Si, Opt. Lett. 19(11), 798-800 (1994).

J. Yang, Z. Zhou, H. Jia, X. Zhang, and S. Qin, High-performance and compact binary blazed grating coupler based on an asymmetric subgrating structure and vertical coupling, Opt. Lett. 36(14), 2614-2617 (2011).

D. Taillaert, W. Bogaerts, P. Bienstman, T. F. Krauss, P. Van Daele, I. Moerman, S. Verstuyft, K. De Mesel, and R. Baets, An out-of-plane grating coupler for efficient butt-coupling between compact planar waveguides and single-mode fibers, IEEE J. Quantum Electron. 38(7), 949-955 (2002).

D. Vercruysse, P. Neutens, L. Lagae, N. Verellen, and P. Van Dorpe, Single asymmetric plasmonic antenna as a directional coupler to a dielectric waveguide, ACS Photonics 4(6), 1398-1402 (2017).

D.A. Powell, and Y.S. Kivshar, Substrate-induced bianisotropy in metamaterials, ACS Photonics 4(6), 1398-1402 (2010).

G. Lavigne, K. Achouri, V. S. Asadchy, S. A. Tretyakov, and C. Caloz, Susceptibility derivation and experimental demonstration of refracting metasurfaces without spurious diffraction, IEEE Trans. Antennas Propag. 66(3), 1321-1330 (2018).

R.C. Tyan, A.A. Salvekar, H.P. Chou, C.C. Cheng, A. Scherer, P. C. Sun, F. Xu, and Y. Fainman, Design, fabrication, and characterization of form-birefringent multilayer polarizing beam splitter, Josa A, vol. 14(7), p. 1627-1636, 1997.

M. Schmitz, R. Bruer, and O. Bryngdahl, Gratings in the resonance domain as polarizing beam splitters, Optics letters, vol. 20(17), p. 1830-1831, 1995.

P. Lalanne, J. Hazart, P. Chavel, E. Cambril, and H. Launois, A transmission polarizing beam splitter grating, Journal of Optics A: Pure and Applied Optics, vol. 1(2), p. 215-219, 1999.

(56) References Cited

OTHER PUBLICATIONS

A. Pors, O. Albrektsen, I. P. Radko, and S. I. Bozhevolnyi, Gap plasmon-based metasurfaces for total control of reflected light, Scientific reports, vol. 3:2155, p. 1-6, 2013.
Z. Ma, S. M. Hanham, Y. Gong, and M. Hong, All-dielectric reflective half-wave plate metasurface based on the anisotropic excitation of electric and magnetic dipole resonances, Optics letters, vol. 43(4), p. 911-914, 2018.

* cited by examiner 108
106
100
W
L
104

100

106
108
104

104
106
108
Incident
Ewaveguide
kz
Hy
Ex

104
Ewaveguide/unguided
Incident
Ewaveguide/unguided
Incident

104
EBeat
Incident 104
kwaveguide
Incident
kz
Hy
Ex 104
kwaveguide/unguided
Incident
kwaveguide/unguided
Incident 104
kbeat
Incident

METHOD AND DEVICES FOR EFFICIENT MANIPULATION OF LIGHT USING WAVEGUIDE SCATTERER ARRAYS

CROSS-REFERENCE TO RELATED APPLICATIONS

The present application is a US National Stage of International Application No. PCT/CA2020/051046, filed on Jul. 30, 2020, which claims priority of U.S. application No. 62/880,333 filed on Jul. 30, 2019, the entire contents of which are incorporated by reference herein.

TECHNICAL FIELD

The present disclosure relates generally to scattering elements, and, more particularly, to grating devices comprising scattering elements.

BACKGROUND OF THE ART

Optical systems rely on various components to manipulate the phase, amplitude and polarization of light. For more than a century, diffraction gratings have been used to periodically modulate the phase of incident light to achieve deflection and dispersion into desired directions. They are widespread across a range of applications such as spectroscopy, ultrafast optics, imaging, optical holography and integrated photonics. To avoid scattering into undesired diffraction orders, a common approach is the use of blazed gratings. This approach, however, is inefficient for deflection angles above approximately 20°, which is a requirement for applications such as flat-lens imaging with large field-of-view and high resolution spectroscopy. The inefficiency is a result of shadowing from the saw-tooth topology. One solution is the use of binary-blazed gratings where the waveguiding nature of the multiple phase delaying elements helps concentrate the field inside the dielectric structure. However, for deflection angles larger than approximately 40°, it is difficult to adequately discretize the phase elements within a grating period without any coupling between neighboring waveguides and to avoid any high aspect ratio structures.

By relying on resonant phase delays rather than propagation delay, resonating gratings based on metasurfaces do not require high aspect ratio fabrication. Metasurface based gratings have shown unprecedented capability for extreme phase control by means of sub-wavelength plasmonic or dielectric resonators to emulate electromagnetic properties that are not achievable with natural materials. The deep-subwavelength size of plasmonic resonator helps in fine discretization of the phase within the diffractive period, but their efficiency is limited due to ohmic metal losses at optical frequencies. Dielectric resonators have negligible absorptive loss, but their relatively large lateral dimensions severely restrict appropriate phase discretization.

As such, there is a need for improved scatting elements and grating devices.

SUMMARY

The present disclosure is generally drawn to grating devices comprising non-resonating or weakly resonating grating elements and at least one waveguide. The grating devices and/or grating elements described herein may be used in optical and/or microwave applications. A low aspect-ratio waveguide may be used to replace the multiple phase elements of conventional binary-blazed or metasurface gratings. The non-resonant or weakly resonant nature of the grating elements may allow for large operational bandwidth to be achieved and may be designed to be minimally sensitive to variations in the angle of the incident beam compared to dispersive dielectric resonator based gratings. The grating devices described herein may have negligible absorption losses as compared to plasmonic metasurface-based gratings. The physical mechanism behind the grating devices described herein relies on the control of the radiation pattern using interference between multiple guided and/or radiative components of light.

As used herein, the term ‘guided components’ refers to eigenmodes of a two-dimensional cross-section containing that of a waveguide, along the propagation direction of light, with an effective refractive index ($n_{eff}$) higher than or equal to one (1) (i.e. $n_{eff} \geq 1$). Eigenmodes with effective refractive index below one (1) (i.e. $n_{eff}<1$) are referred to herein as ‘radiative components’. In particular and as will be discussed further below, the grating devices comprise a dielectric waveguide member that, when illuminated supports a power distribution, which oscillates along the length of the waveguide member. This oscillation occurs due to interference between guided and/or radiative components of the incident wave (i.e. interference between one or more guided components and one or more radiative components, and interference between two or more guided components.). The grating devices may be used for very large deflection angles (e.g., angles exceeding 40°) using one- and two-dimensional arrays of asymmetric waveguides. The grating devices described herein may be referred to as “directive element diffraction gratings (DEDG)”.

In accordance with one aspect, there is provided a scattering element. The scattering element comprises a vertically-oriented waveguide comprising one or more dielectric components configured to provide directional scattering of an incident electromagnetic wave in a pattern caused by one of interference between at least two guided components and interference between at least one guided component and at least one radiative component, the guided and radiative components excited by the incident electromagnetic wave.

In some embodiments, the one or more dielectric components, when illuminated with the incident electromagnetic wave, provide directional scattering by diffracting the incident electromagnetic wave into at least one direction of at least one desired diffraction order and suppressing undesired diffraction orders.

In some embodiments, the scattering element further comprises a substrate on which the waveguide is disposed, the substrate having a first surface and a second surface opposite the first surface, the waveguide extending vertically away from the second surface.

In some embodiments, the electromagnetic wave is incident on the scattering element from one of the first surface and the second surface of the substrate.

In some embodiments, the waveguide comprises a plurality of layers of dielectric materials.

In some embodiments, the substrate comprises a plurality of layers of dielectric materials.

In some embodiments, the waveguide is symmetrical and causes the scattering element to provide directional scattering in a symmetric scattering pattern.

In some embodiments, the waveguide is asymmetrical and causes the scattering element to provide directional scattering in an asymmetric scattering pattern.

In some embodiments, the waveguide is one-dimensional.

In some embodiments, the waveguide is two-dimensional.

In some embodiments, the waveguide is a slot waveguide comprising at least two dielectric components with a void region defined between two consecutive dielectric components.

In some embodiments, the at least two dielectric components of the slot waveguide are different.

In some embodiments, the at least two dielectric components of the slot waveguide are substantially the same.

In accordance with another aspect, there is provided a grating device for transmission or reflection of incident electromagnetic waves in a desired direction. The grating device comprises an array of scattering elements, each scattering element comprising a vertically-oriented waveguide comprising one or more dielectric components configured to provide directional scattering of an incident electromagnetic wave in a pattern caused by one of interference between at least two guided components and interference between at least one guided component and at least one radiative component, the guided and radiative components excited by the incident electromagnetic wave.

In some embodiments, each scattering element has a length corresponding to a diffractive period of the grating device and a width corresponding to a non-diffractive period of the grating device.

In some embodiments, the array of scattering elements is periodic, with the length of the scattering elements remaining substantially the same along the array.

In some embodiments, the array of scattering elements is aperiodic, with the length of the scattering elements varying along the array.

In some embodiments, a shape of the waveguide and the length of the waveguide are set based on a required scattering pattern.

In some embodiments, the grating device is configured to allow selective scattering of the incident electromagnetic wave in desired diffraction orders and suppression of undesired diffraction orders, a number of the diffraction orders determined by the diffractive period of the grating device.

In some embodiments, the grating device is configured as a beam splitter.

In some embodiments, the grating device is configured as a polarization beam splitter.

In some embodiments, the grating device is configured as a grating coupler.

DESCRIPTION OF THE DRAWINGS

Reference is now made to the accompanying figures in which:

FIG. 100 is a directional radiation pattern of the grating element of FIG. 9A with two different design heights, in accordance with an embodiment;

It will be noted that throughout the appended drawings, like features are identified by like reference numerals.

DETAILED DESCRIPTION

With reference to FIGS. 1A to 1D, there is illustrated a grating device 100. In this example, the grating device 100 is an optical grating device for diffracting incident light 102 (i.e. an incident electromagnetic wave) at a deflection angle θ. Three diffraction orders in transmission and reflection are shown for illustrative purposes. The device 100 comprises a periodic array of grating elements 104 for diffracting the incident light 102. The number of grating elements 104 illustrated in FIGS. 1A to 1D is for example purposes only and may vary depending on practical implementations. Accordingly, the array may comprise any suitable number of rows and columns of grating elements 104. The grating device 100 described herein may be manufactured to produce a beam splitter, a polarizing (or polarization) beam splitter, a grating coupler and/or any other suitable optical or microwave device. In some embodiments, the device 100 comprises an aperiodic array of grating elements 104. The grating elements 104 may be referred to as "scattering elements" herein.

Figures 19A, 19B:
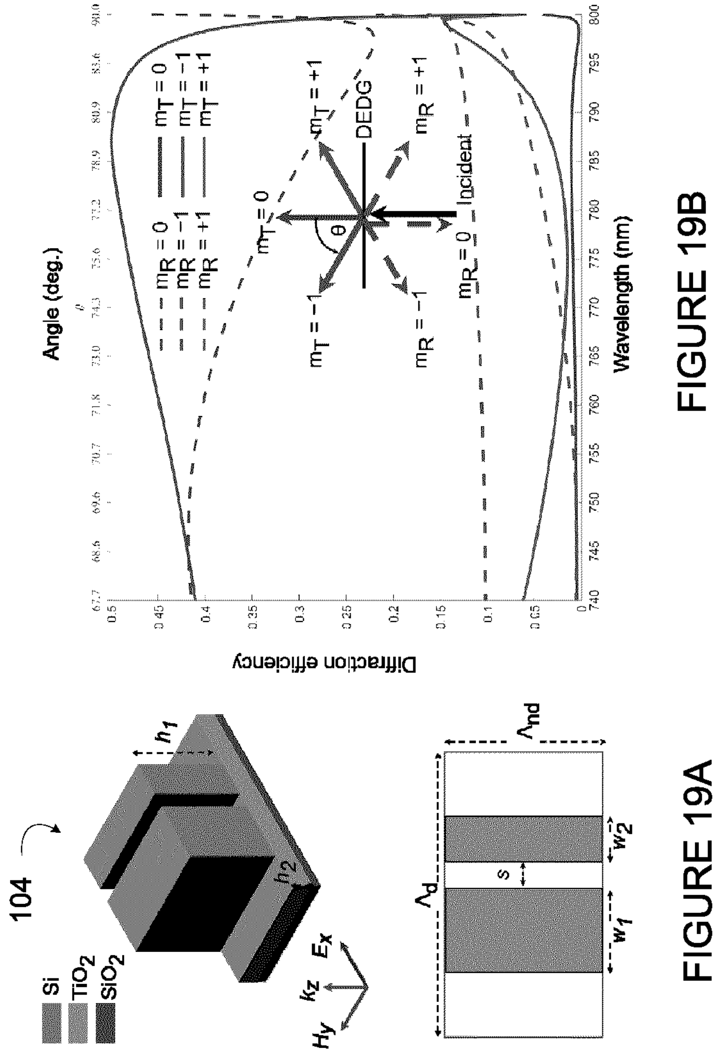
FIG. 19A is a perspective and top view of a multi-layer substrate based transmission-type grating element, in accordance with an embodiment.
FIG. 19B is a graph illustrating diffraction efficiency as a function of wavelength for the grating element of FIG. 19A, in accordance with an embodiment.

Each grating element 104 may be supported by a substrate 106. The substrate 106 may be made of any suitable material. In some embodiments, the substrate 106 is made of glass. The substrate 106 and the grating element 104 may be the same or separate parts. In other words, the grating element 104 may or may not comprise the substrate 106. The incident light 102 can be incident on the grating device 100 from the substrate side 111 or from the superstrate side 112 of the substrate 106 and propagates through the substrate 106. Accordingly, the grating device 100 may work in transmission or reflection modes. In some embodiments, the superstrate will be air. The grating element 104 may be characterized by a length L corresponding to a diffractive period and a width W which in some embodiments corresponds to a non-diffractive period. The diffractive period and the non-diffractive period may be set based on the desired deflection angle θ and/or the wavelength of the incident light 102. The incident light 102 has a wavelength λ and in some embodiments, the non-diffractive period W is set to be a subwavelength of the wavelength λ of the incident light 102 to prevent diffracting of the incident light 102 in the lateral dimension corresponding to the width W. The diffracting period is set to allow for diffracting of the incident light 102 in the lateral dimension corresponding to the length L. The length L and width W of each grating element 104 may vary depending on practical implementations. In some embodiments, the length L of each grating element 104 varies along the array to produce an aperiodic optical grating device, which may be used to produce holograms. In some embodiments, one or more additional layers of dielectric on the substrate 106 may be present (e.g., as shown in FIG. 19A).

Each grating element 104 comprises at least one waveguide 108. The waveguide 108 may comprise more than one dielectric element (also referred to herein as a 'dielectric component' or 'dielectric structure'), such as in the case of slot waveguides. Accordingly, any reference to the term 'waveguide' herein may refer to one or more dielectric structures. The waveguide 108 extends from the second surface (i.e. the superstrate side) 112 of the substrate 106 by a waveguide height H (which may be referred to as the "waveguide length"). The waveguide height H is generally set based on the desired deflection angle θ. In some embodiments, each grating element 104 is configured such that the incident light 102 excites at least two components, in which the maximum field concentration of a first component propagates through the waveguide 108 and the maximum field concentration of a second component propagates through the second surface 112 outside of the waveguide 108. In some embodiments, such as in the case of a slot waveguide, the waveguide 108 may comprise two or more) dielectric structures along with the void region between them, whereas the maximum field concentration of the first component may propagate through the void region. The first and second component interfere with each other based on the configuration of the waveguide 108 (e.g., the waveguide height H, the shape of the waveguide 108, the material of the waveguide 108 and/or propagation constant of the waveguide 108), thereby diffracting the incident light 102 at the deflection angle θ. The first and second component of the incident light 102 may be 'guided' or 'radiative' in nature and may be referred to as the "guided/radiative" wave, field, part, mode or component. In one embodiment, the first component of the incident light 102 is a guided component while the second component of the incident light 102 may be a guided component or a radiative component.

Figure 1A:
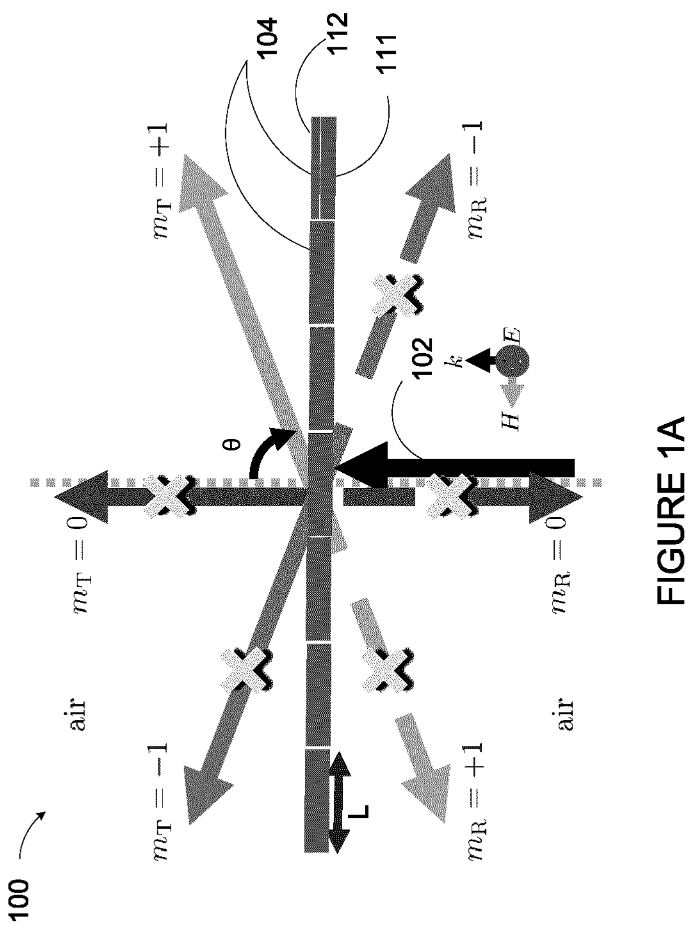
FIG. 1A is a schematic diagram of a grating device, in accordance with an embodiment.
Figure 1B:
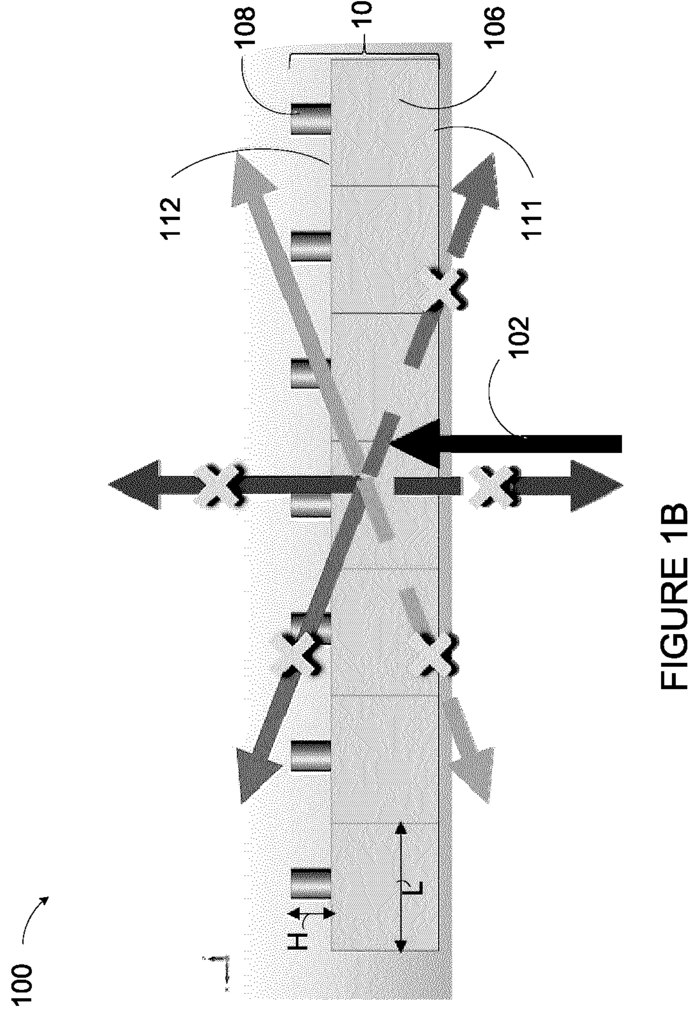
FIG. 1B is side view of an example grating device, in accordance with an embodiment.

The grating device 100 may be periodic. The grating device 100 may allow for selective scattering only in desired diffraction orders (e.g., $m_T$=+1 in FIG. 1A) and suppressing all other undesired diffraction orders (e.g., $m_T$=−1, $m_T$=0, $m_R$=+1, $m_R$=−1, $m_R$=0 in FIG. 1A, where "m" refers to the diffraction order, "R" refers to reflection, and "T" refers to transmission). The number of diffraction orders supported by the grating device 100 is related to the diffraction length L. In the example of FIG. 1A, the diffraction length L is set to have only first order diffractions. In some embodiments, the diffraction length L may be set in order to have higher diffraction orders (i.e., $m_R$ or $m_T$=+/−2 or higher) and the undesired diffractions can accordingly be suppressed. The waveguide 108 may be referred to as a "waveguide structure" and may comprise multiple dielectric elements (which may be referred to as waveguide components). The vertically oriented waveguide structure 108 is within the diffractive period and acts as a directional scattering element. The waveguide 108 may be made of any suitable dielectric material. In some embodiments, the substrate 106 and the waveguide 108 are made of the same material. In some embodiments, the waveguide 108 may be produced by etching the substrate 106.

When the aperture (e.g., the first surface, or substrate side, 111) of grating element 104 is illuminated with an incident wave, the incident field is coupled into at least two eigenmodes of the waveguide 108. The tangential and normal components, with respect to the dielectric boundaries, of one guided mode interfere with another guided or radiative mode. Equivalently, this interference may be considered to result from the beating between multiple guided and/or radiation modes supported by the grating element 104. This interference gives rise to a spatially varying field distribution on the lateral plane of the grating element 104, along the height H, both inside and outside of the waveguide 108. In particular, when the grating element 104 is illuminated with the incident wave, the waveguide 108 supports a power distribution, which oscillates along the length of the waveguide 108 as a result of the interference between guided and/or radiative components (i.e. interference between at least two guided components or interference between at least one guided component and at least one radiative component) excited by the incident wave Depending on the total length of the waveguide 108, the resulting field distribution on the other end of waveguide 108 could be calculated and from that field distribution, far-field scattering pattern of the waveguide 108 could be obtained from Fourier transform. The waveguides 108 in a grating element 104 may be arranged in a such a way that the scattering pattern produced therefrom is a maximum in a desired direction and a minimum in an undesired direction. Symmetric or asymmetrical scattering pattern may be realized by considering symmetrical waveguide or asymmetrical waveguide, respectively. While realizing symmetric scattering pattern is easier from a single waveguide, it is difficult to generate asymmetrical scattering pattern. In such cases, a slot waveguide 108 with two different dielectric structures on both sides of it may efficiently realize an asymmetrical scattering pattern. If such directionally radiating waveguides 108 are arranged in a grating fashion, the overall scattering pattern for the two dimensional array could be calculated from the array factor multiplied by the scattering field of each grating element 104. In other words, the diffractive period of the grating element 104 determines the number of diffraction orders and their corresponding directions towards transmission side and reflection side. If the scattering pattern of each waveguide 108 is also towards one of the desired diffraction orders, the direction to which incident light is required to be bent, then maximum efficiency may be realized from the device 100.

Figures 1C, 1D, 1E:
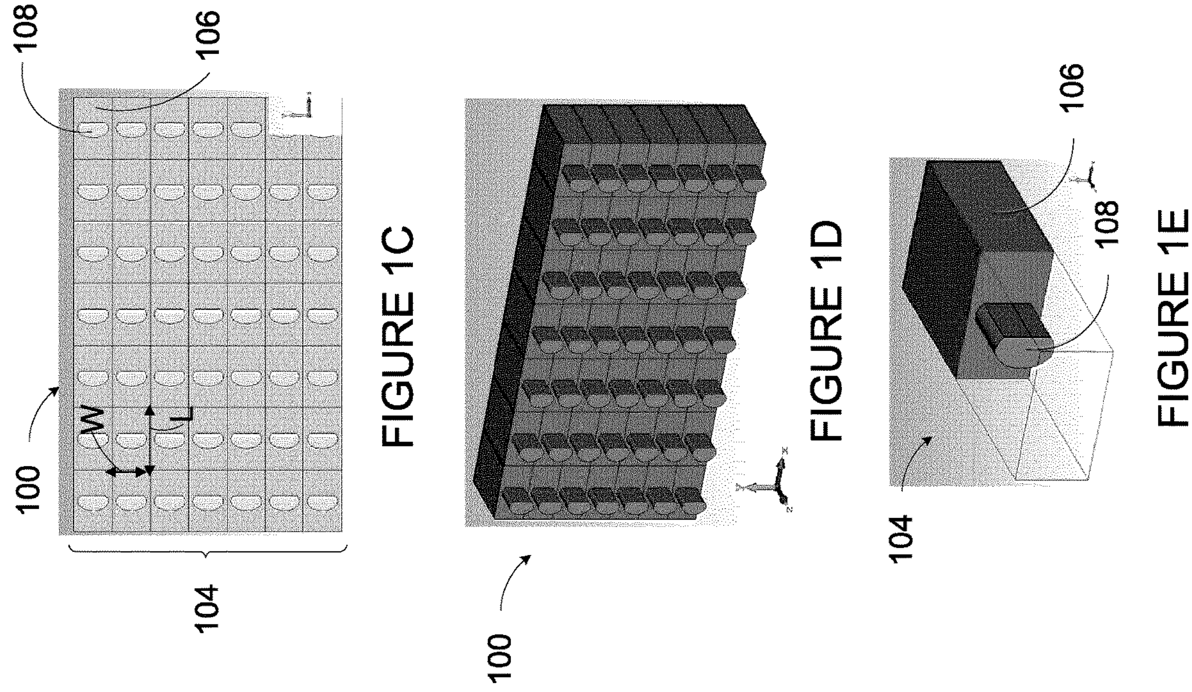
FIGS. 1C and 1D are respectively a top and a perspective view of the grating device of FIG. 1B, in accordance with an embodiment.
FIG. 1E is an example of a grating element, in accordance with an embodiment.

With additional reference to FIG. 1E, the grating element 104 used in the grating device 100 of FIGS. 1A to 1D is illustrated. FIG. 1E illustrates an asymmetric waveguide that may be used to generate an asymmetrical and directional radiation pattern. However, the configuration of the grating element 104 may vary from that illustrated in FIG. 1E. Various examples of the configuration of the grating element 104 are described in further detail elsewhere in this document.

Figure 2:
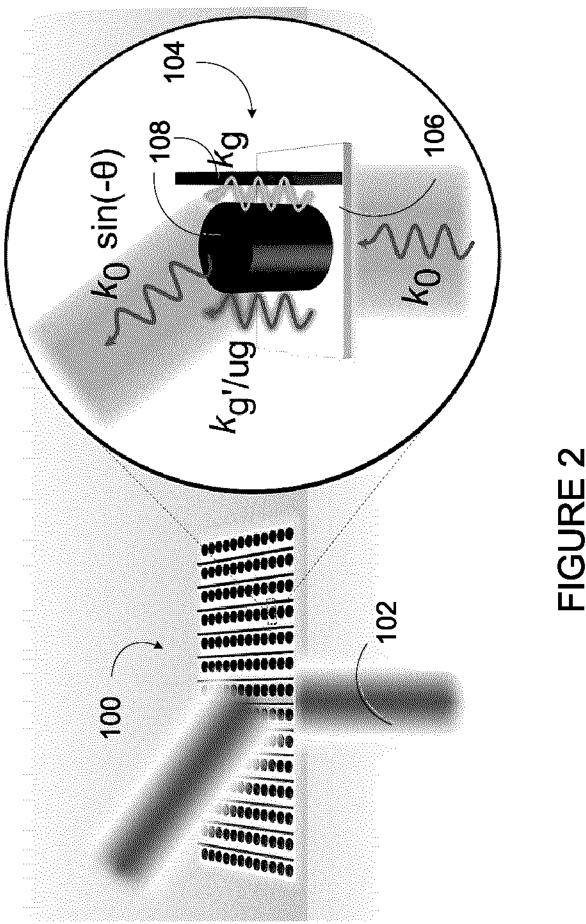
FIG. 2 is a schematic diagram of a grating device illustrating the propagation of incident light through a grating element, in accordance with an embodiment.

With reference to FIG. 2, a method for designing and/or producing the grating device 100 will now be described. As illustrated, the grating device 100 is illuminated with incident light 102 from the substrate-side (bottom side in FIG. 2) of the periodic array of grating elements 104. The incident light is diffracted into the direction of a desired diffraction order (m=−1 in FIG. 2) in transmission while suppressing all other undesired diffraction orders. In this example, each of the grating elements 104 comprises an asymmetric slot waveguide structure 108 comprising two dielectric components. The grating device 100 is illuminated from the bottom with incident light 102 of propagation constant $k_0$. The grating element 104 radiates a maximum amount of power along $k_0 \sin(-\theta)$ direction due to an interference phenomenon. $k_g$ and $k_{g'/ug}$ are the propagation constants of a guided component with its maximum field concentration propagating through the waveguide, i.e., either through the dielectric structures or the void region between them (i.e. between consecutive dielectric structures), and another guided component ($k_{g'}$) or a radiative component ($k_{ug}$) with its maximum field concentration propagating in air, outside of the waveguide, respectively. For grating devices 100 implemented without any cladding materials, $k_{g'/ug} \approx k_0$, and $k_g$ depends on the effective refractive index of the waveguides 108. For grating devices implemented with cladding materials, $k_{g'/ug} \approx k_{clad}$ (propagation constant in the cladding), which depends upon the refractive index of the cladding material.

Figures 3A, 3B, 3C, 3D, 3E, 3F:
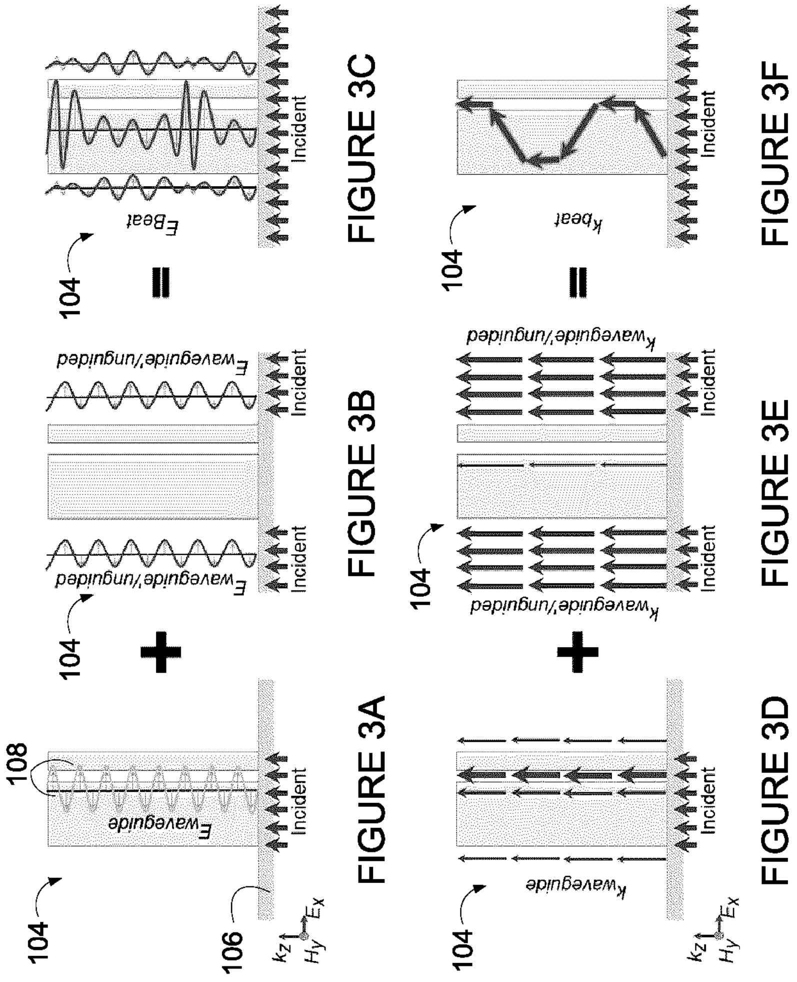
FIG. 3A to 3F illustrate an interference effect of the grating element, in accordance with an embodiment.

With additional reference to FIGS. 3A to 3F, the interference effect governing the asymmetric/symmetric radiation pattern of the grating device 104 having a slot waveguide 108 with two dielectric components is shown. FIGS. 3A and 3D show electric field vectors and Poynting vectors along the propagation direction, respectively, for the first component which is a guided wave ($k_{waveguide}$ or $k_g$) with its maximum field concentration propagating inside the dielectric. FIGS. 3B and 3E show electric field vectors and Poynting vectors along the propagation direction, respectively, for the second component which is another guided or unguided (or radiative) wave ($k_{waveguide'/unguided}$ or $k_{g'/ug}$) with its maximum field concentration propagating outside of the waveguide. FIGS. 3C and 3F show electric field vectors and Poynting vectors along the propagation direction, respectively, for the beating wave generated due to the interference of the first guided component, $k_g$, and the second component, $k_{g'/ug}$, when the whole aperture of the grating device 104 is illuminated. Thus, the interference of the multiple guided and/or unguided (or radiative) components can be controlled to achieve deflection of the incident light 102 at the deflection angle θ by accordingly setting the waveguide height H, the shape of the waveguide 108, the material of the waveguide 108 and/or any other suitable parameter(s).

The periodic array of diffracting elements 104 can be understood as an array of secondary radiators with the incident beam 102 being the primary excitation source. The overall scattering pattern of the array is based on the pattern multiplication principle and depends on the element factor and the array factor. The element factor represents the radiation pattern of each individual secondary radiator, whereas the array factor represents the radiation pattern of an array of isotropically radiating elements. The advantage of the pattern multiplication principle is that it allows to treat each element and the array separately. In contrast to the equivalent Bloch mode analysis, the pattern multiplication principle provides a straightforward understanding of the role of the array and its elements. Considering the array factor, for an infinite number of isotropic scattering-elements 104, the array factor reduces to a Dirac delta function peaked in the same direction as the diffraction orders of a conventional grating. For a given grating period $\lambda_d$, the corresponding angle can be calculated using the grating equation, as is known by the person skilled in the art. For simplicity, we consider a wavelength-scale period $\lambda_d$, such that only the zero and first order diffraction orders are supported (m=−1, 0, 1). This results in three propagating beams in the transmission side (e.g., $m_1=-1$, $m_1=0$, and $m_1=1$ in FIG. 1A) and three in the reflection side (e.g., $m_R=-1$, $m_R=0$, and $m_R=1$ in FIG. 1A). Two assumptions for the purposes of the analysis are made. First, the incident beam width is considered to be much larger than the array period, which allows to approximate the incident light 102 on individual scatter elements 104 as plane waves. Second, there is no change in orientation among the scattering elements, which allows for the consideration of a single polarization state. In this simplified scenario, the amount of power of the incident light 102 that goes to each diffraction order can then be controlled by changing the element factor (the scattering pattern) of the secondary radiators.

For a transmission-type grating device, it is desirable to align the maxima of the element factor with one or more of the diffraction orders on the transmission side. For this, a grating element 104 containing at least one vertically-oriented slot waveguide 108 as the secondary radiator element is chosen. If there is negligible reflection due to sufficient mode overlap with the structure of the grating element 104, the three diffraction orders in the reflection side may be completely suppressed. To maximize the diffraction efficiency into the desired diffraction orders, a directional scattering element that radiates efficiently towards the desired directions is used, while also minimizing the radiation along the undesired diffraction orders.

Figures 4A, 4B:
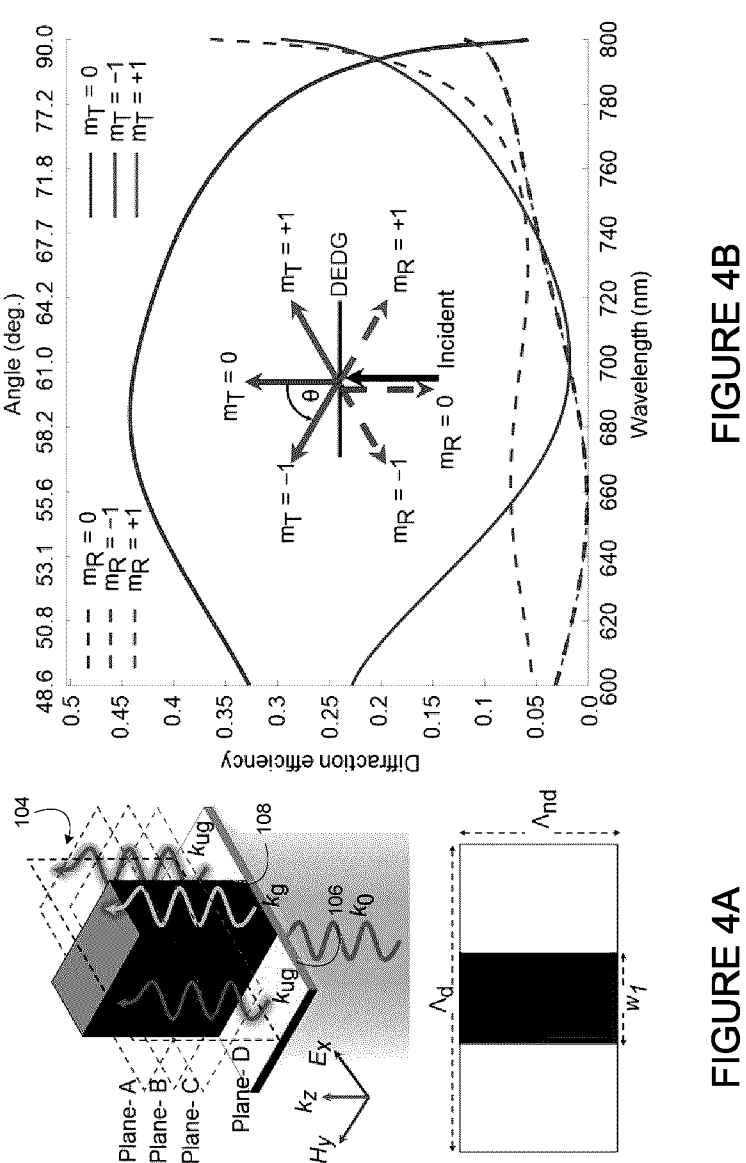
FIG. 4A is a perspective and top view of a one-dimensional array of symmetric waveguide based grating element, in accordance with an embodiment.
FIG. 4B is a graph illustrating diffraction efficiency as a function of wavelength for the grating element of FIG. 4A.
Figures 9A, 9B:
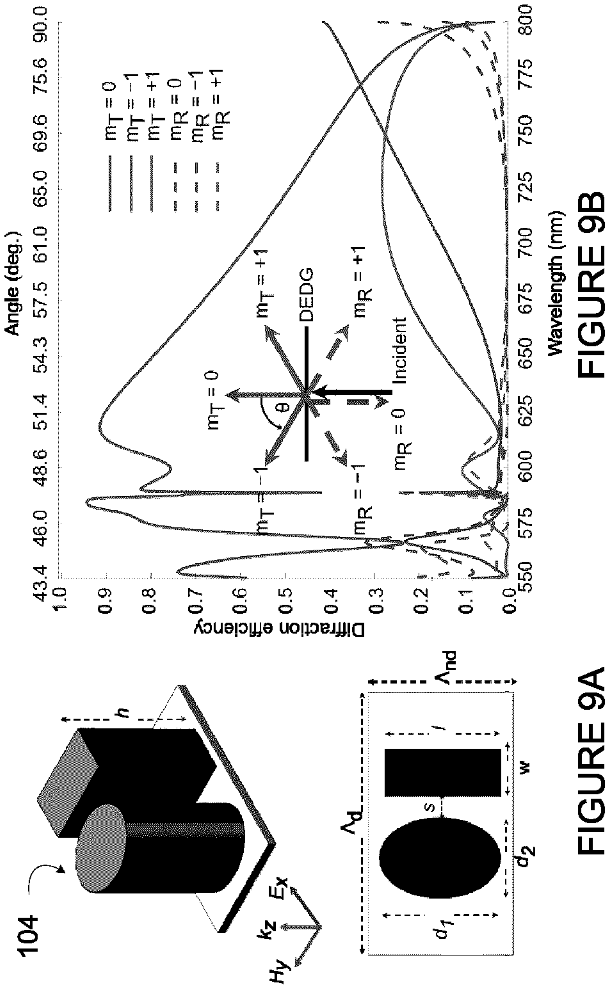
FIG. 9A is a perspective and top view of a two-dimensional array of asymmetric waveguide based grating elements, in accordance with an embodiment.
FIG. 9B is a graph illustrating diffraction efficiency as a function of wavelength for the grating element of FIG. 9A.

To further illustrate these concepts, reference is made to FIGS. 4A and 4B. In this example, a simple symmetric $TiO_2$ waveguide 108 is considered for the grating element 104. The material of the waveguide 108 may vary depending on practical implementations. The directional grating element 104 is configured to be sufficient to eliminate the m=0 diffraction order. In the lateral plane of the grating element 104, the symmetric waveguide 108 can be arranged in a one-dimensional array (e.g., a slab waveguide, which has a finite dimension along the z-axis of FIG. 4A, i.e. a finite height, and a finite dimension along the x-axis of FIG. 4A, i.e. a finite thickness), as is shown in FIG. 4A, or a two-dimensional array (e.g., square, rectangular or elliptical waveguides, which is finite along all three dimensions, i.e. along the x, y, and z axes of FIG. 9A), as shown in FIG. 9A. The example shown in FIG. 4A, illustrates a one-dimensional array of waveguides 108 with a diffractive period $\lambda_d$=800 nm and a non-diffractive period $\lambda_{nd}$=350 nm. The width of the waveguide 108 corresponds to $w_1$=235 nm. The effective refractive index, $n_{eff}$, for the first guided component, calculated from a 2-D simulation is 2.12. FIG. 4B shows that over a broad bandwidth, most of the incident power is equally transmitted into the m=−1, 1 diffraction orders and that less than 5% of the power is transmitted into the m=0 diffraction order over a 75 nm bandwidth.

To understand the origin of the directional scattering, we need to consider propagation in regions of the grating element 104 within and outside of the waveguide as shown in FIG. 4A. The first guided component excited by the incident wave will propagate through the waveguide with its maximum field concentration lying within the waveguide and the second part will be unguided or radiative with its maximum field concentration propagating in air. The guided component will have a propagation constant, which corresponds principally to the effective refractive index, $n_{eff}$, of the lowest order mode, while for the unguided or radiative wave, it will be very close to the refractive index of air. Electromagnetic boundary conditions impose that the tangential magnetic field component is continuous and the normal electric filed component is discontinuous at the waveguide boundaries. Due to the difference in propagation constant between guided and unguided parts of the field, the normal and tangential components of the guided mode interfere with the unguided mode.

Destructive and constructive interferences between these two components lead to variations of the field within and outside of the waveguide. This phenomenon gives rise to a periodically varying field pattern along the propagation direction of the waveguide. To study the field variation along the grating height, three horizontal cutting-planes A, B and C intersecting vertical cutting-plane D at corresponding heights $h_1$, $h_2$, and $h_3$ are respectively defined. In the example of FIG. 4A, the horizontal cutting-planes A, B, and C are at a height of $h_1$=300 nm, $h_2$=600 nm, and $h_3$=900 nm, respectively. With additional reference to FIG. 5A, the field concentration $Re\{E_x\}$ varies along the vertical direction z due to constructive (at height $h_2$) and destructive (at heights $h_1$ and $h_3$) interference effects. This contrasts strongly with the uniform field anticipated if only one guided mode were to be excited. The corresponding beat length $h_b=h_3-h_1=2(h_2-h_1)$ is simply given by $h_b \approx \lambda_0/(n_{eff}-n_{air})$, where $\lambda_0$ is the free-space wavelength and $n_{air}$ is the refractive index of air.

Figures 5A, 5B, 5C:
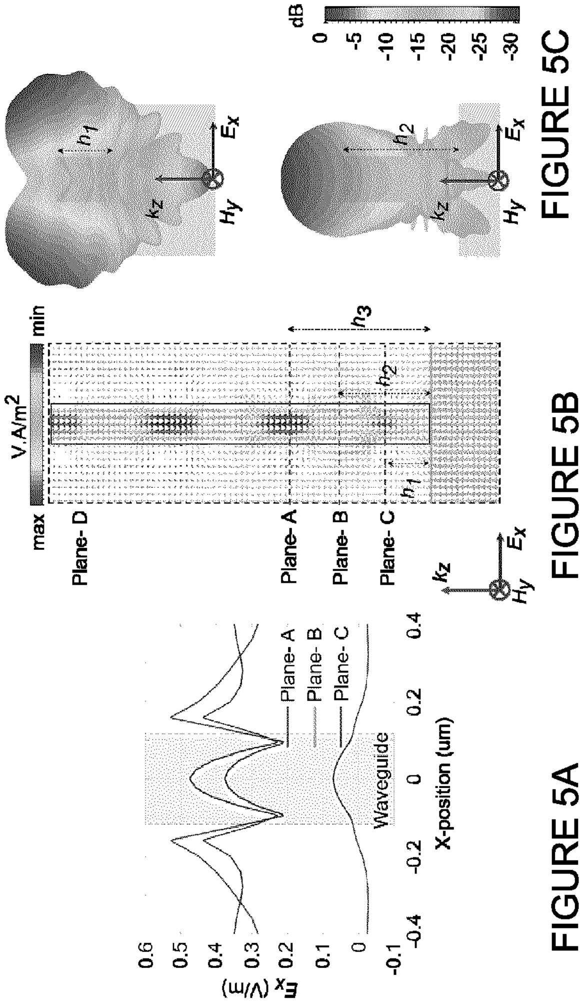
FIG. 5A is a plot of field concentration at intersecting lines between three planes of the waveguide of FIG. 4A, in accordance with an embodiment.
FIG. 5B is an absolute Poynting vector plot of the grating element of FIG. 4A, in accordance with an embodiment.
FIG. 5C is a directional radiation pattern of the grating element of FIG. 4A with two different design heights, in accordance with an embodiment.

The rate at which the fields vary due to beating depends on the difference between $n_{eff}$ and $n_{air}$. Given that the time-averaged power integrated over planes A, B or C is constant, the Poynting vector inside the waveguide alternates between pointing inward or outward from the center as a function of the position along z-axis to maintain the varying field profile. This is shown in FIG. 5B for the one-dimensional waveguide of FIG. 4A. Smaller beat lengths lead to a higher rate of field variation and allow for the Poynting vector components to make a larger angle to the z-axis. As shown in FIG. 5C, choosing height $h_1$ for the waveguide height H, which corresponds to an outwards flowing Poynting vector, produces a radiation pattern with a minimum along m=0 that can be used to eliminate the corresponding diffraction order. In contrast, choosing height $h_2$, leads to a maximum in the vertical (m=0) direction.

As shown in FIG. 4B, a symmetric rectangular waveguide 108 based grating device 104 acts like a beamsplitter by suppressing the m=0 diffraction order while separating all the incident power to both of its first-order diffraction orders equally. However, to redirect all of the power into a single diffraction order requires eliminating one of the remaining two diffraction orders using an asymmetric directional scattering-element. An asymmetric field distribution on the lateral plane may be obtained by using an asymmetric slot waveguide comprising different symmetric structures on both sides of a slot. This approach allows for flexibility in optimizing the radiation profile at the design stage. The field distribution and the effective refractive index for asymmetric slot waveguides can be readily calculated as described in Ma, C. Zhang, Q., Van Keuren, E., *Optics Communications,* 2009, 282, 324-328, and Almeida, V. R., Xu, Q., Barrios, C. A., Lipson, M., *Optics letters,* 2004, 29, 1209-1211.

Figures 6A, 6B:
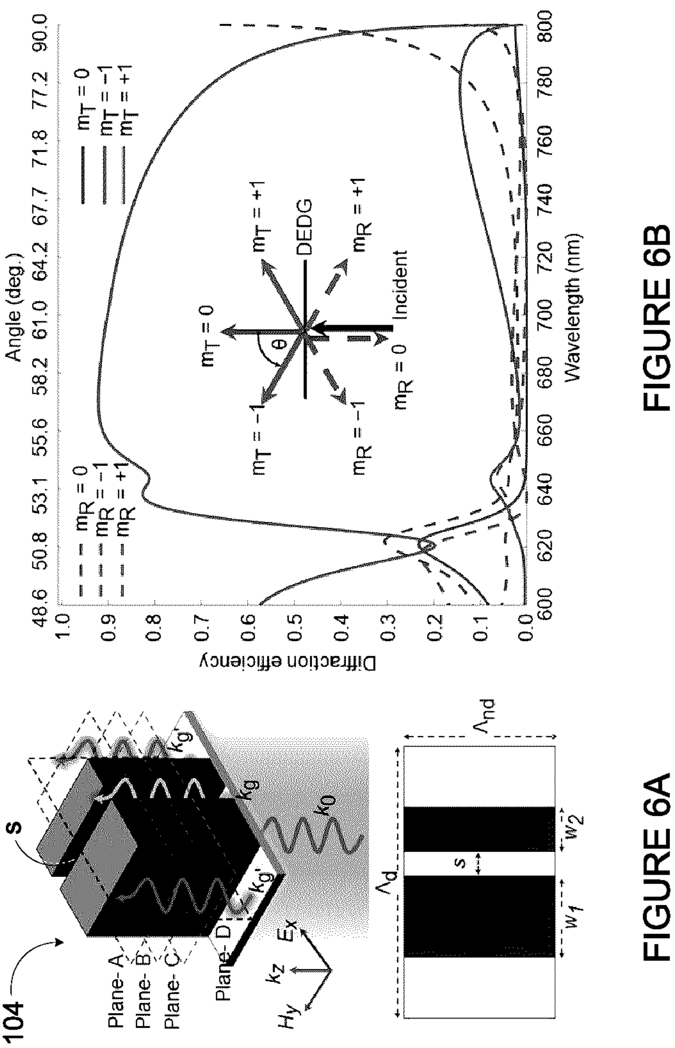
FIG. 6A is a perspective and top view of a one-dimensional array of asymmetric waveguide based grating elements, in accordance with an embodiment.
FIG. 6B is a graph illustrating diffraction efficiency as a function of wavelength for the grating element of FIG. 6A.

With reference to FIG. 6A, a grating element 104 comprising an asymmetric waveguide 108 with a slot s is shown. The slot s may be provided in the waveguide 108 by introducing a thin dielectric slab next to the symmetric structure described in FIG. 4A. The design parameter values are, $\lambda_d$=800 nm, $\lambda_{nd}$=350 nm, $w_1$=235 nm, $w_2$=135 nm, and s=50 nm. The horizontal cutting-plane A, B, and C are at a height of $h_1$=340, nm $h_2$=680 nm, and $h_3$=1020 nm, respectively. FIG. 6B shows the diffraction efficiency of the grating element of FIG. 6A as a function of wavelength for a chosen height $h_1$ for the structural length H of the waveguide 108, which in this specific and non-limiting example is 390 nm. This design may lead to remarkably high diffraction efficiencies of 50% for a deflection angle of ~82.46° and a maximum efficiency of 92% for a deflection angle of ~56°. The simulation results shows a diffraction efficiency of more than 50% for ~165 nm bandwidth covering the entire red spectrum.

Figures 7A, 7B, 7C:
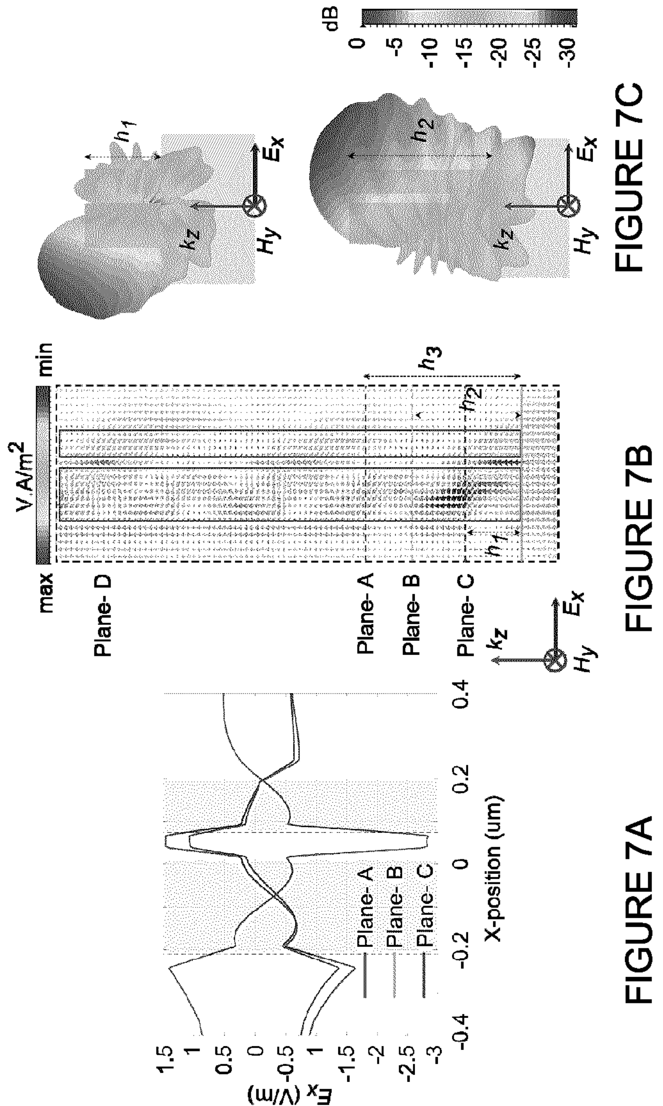
FIG. 7A is a plot of field concentration at intersecting lines between three planes of the waveguide of FIG. 6A, in accordance with an embodiment.
FIG. 7B is an absolute Poynting vector plot of the grating element of FIG. 6A, in accordance with an embodiment.
FIG. 7C is a directional radiation pattern of the grating element of FIG. 6A with two different design heights, in accordance with an embodiment.
Figure 8:
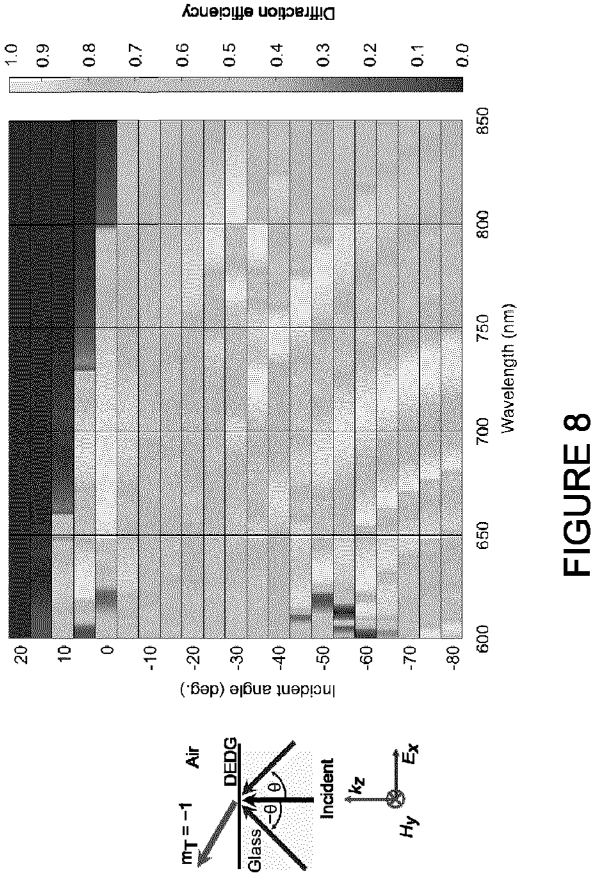
FIG. 8 is a diffraction efficiency plot for the asymmetric waveguide based grating element of FIG. 6A, as a function of the incident angle, in accordance with an embodiment.

With contrast to the symmetric waveguide, the second component, excited by the incident light, in this asymmetric waveguide is also another guided field and the interference effect between these two guided components in the asymmetric waveguide section leads to field variation along the height of the grating element 104. To study the asymmetric profile of the propagating field components, vertical and horizontal cutting-plans are defined similar to the symmetric one-dimensional waveguide analysis. As shown in FIG. 7A, the $Re\{E_x\}$ field components vary along the propagation direction. It should be noted that the proposed asymmetric waveguide design can support three lower order modes $TM_0$, $TM_1$, and $TM_2$ for a wavelength of 700 nm. The $TM_1$ mode is weakly or not excited, whereas the $TM_0$ and $TM_2$ modes are almost equally excited and interfere with each other. In this case, the corresponding beat length calculation changes to $h_b=\lambda_0/(n_{TM0}-n_{TM2})$, where $n_{TM0}$ and $n_{TM2}$ are the effective refractive indices of the corresponding modes. The effective refractive index of this second guided component, $n_{TM2}$, is close to $n_{air}$. The asymmetric flow of Poynting vectors is shown in FIG. 7B, and FIG. 7C shows that choosing height $h_1$ or $h_2$, a directional asymmetric radiation pattern could be achieved from a scattering-element. FIG. 8 illustrates simulation results of the incident angle response for the one-dimensional asymmetric waveguide design of FIG. 6A. A relatively high diffraction efficiency for a broad range of incidence angles in the glass substrate along $-\theta$ direction is observed, whereas for the $+\theta$ (greater than 15°) the desired diffraction order becomes evanescent in the same frequency range.

Figures 10A, 10B, 10C:
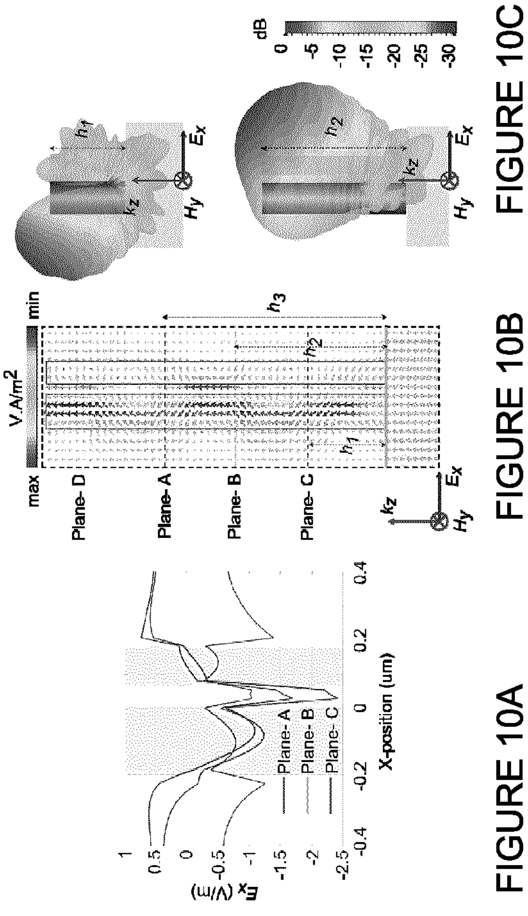
FIG. 10A is a plot of field concentration at intersecting lines between three planes of the waveguide of FIG. 9A, in accordance with an embodiment.
FIG. 10B is an absolute Poynting vector plot of the grating element of FIG. 9A, in accordance with an embodiment.
Figures 11A, 11B:
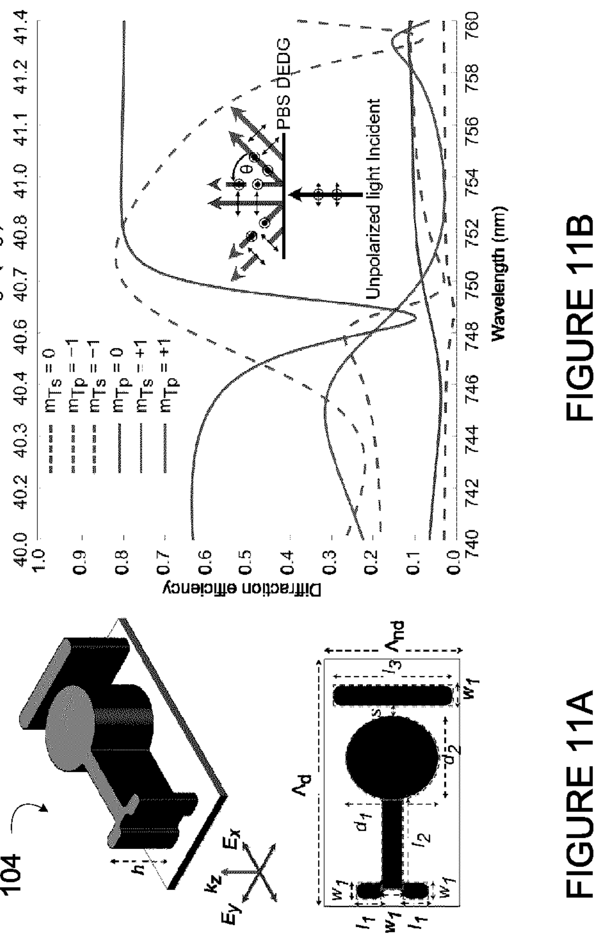
FIG. 11A is a perspective and top view of a polarizing beam splitter grating element, in accordance with an embodiment.
FIG. 11B is a graph illustrating diffraction efficiency as a function of wavelength for the grating element of FIG. 11A, in accordance with an embodiment.
Figures 12A, 12B:
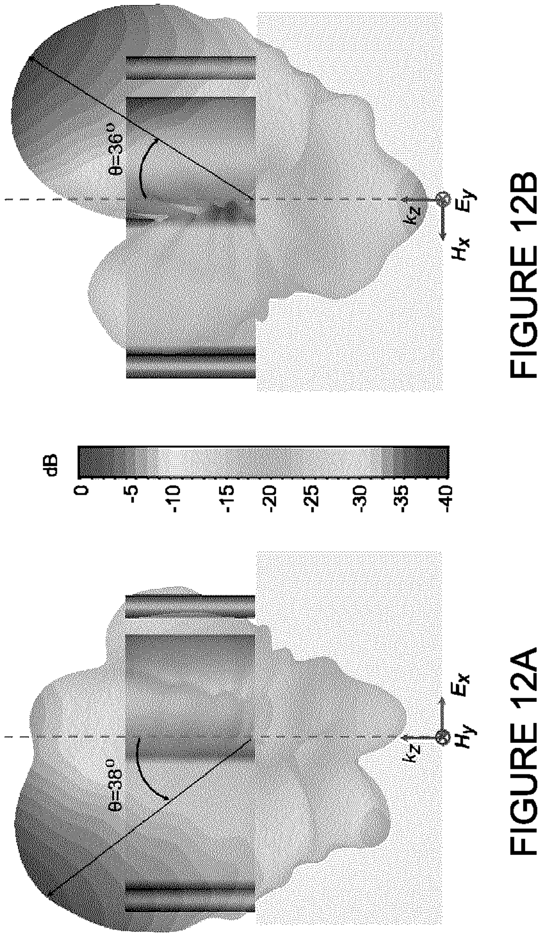
FIGS. 12A and 12B are radiation patterns for the grating element of FIG. 11A for x-polarized light and y-polarized light, in accordance with an embodiment.

In contrast to asymmetric one-dimensional waveguide sections, two-dimensional waveguide sections provide additional advantages. First, it introduces an extra set of design parameters that can be adjusted for further optimization and second, the waveguide architecture is robust for polarization control. A two-dimensional asymmetric waveguide design are demonstrated for relatively moderate deflection angles (~45° to 55°) as shown in FIG. 9A. The diffraction efficiency is shown in FIG. 9B and it reaches a maximum of 94.4% for a deflection angle of ~47° and 91.64% for ~50°. The asymmetric flow of the Poynting vector is shown in FIG. 10B. FIG. 100 shows the radiation pattern of the grating element 104 depending on the height of the structure and an array of such elements can enhance the m=+1 or m=−1 order in transmission respectively while suppressing the undesired diffraction orders. To demonstrate the polarization control capability of transmission-type diffraction grating devices 100, a polarizing beam splitter grating is shown in FIG. 11A. The design was optimized from the asymmetric two-dimensional waveguide grating element 104 and is operating at a center wavelength of $\lambda_0$=752 nm. As shown in FIG. 11B, the grating element 104 of FIG. 11A reaches an efficiency of ~80% for both polarizations with a separation angle of 80° between the polarized light beams. FIGS. 12A and 12B show the radiation pattern of the grating element 104 when illuminated with x- and y-polarized plane waves from the substrate side. The polarization extinction ratio is ~12 dB for the beams along both positive and negative first-order diffraction directions at 752 nm.

Figures 13A, 13B, 13C, 13D, 13E, 13F:
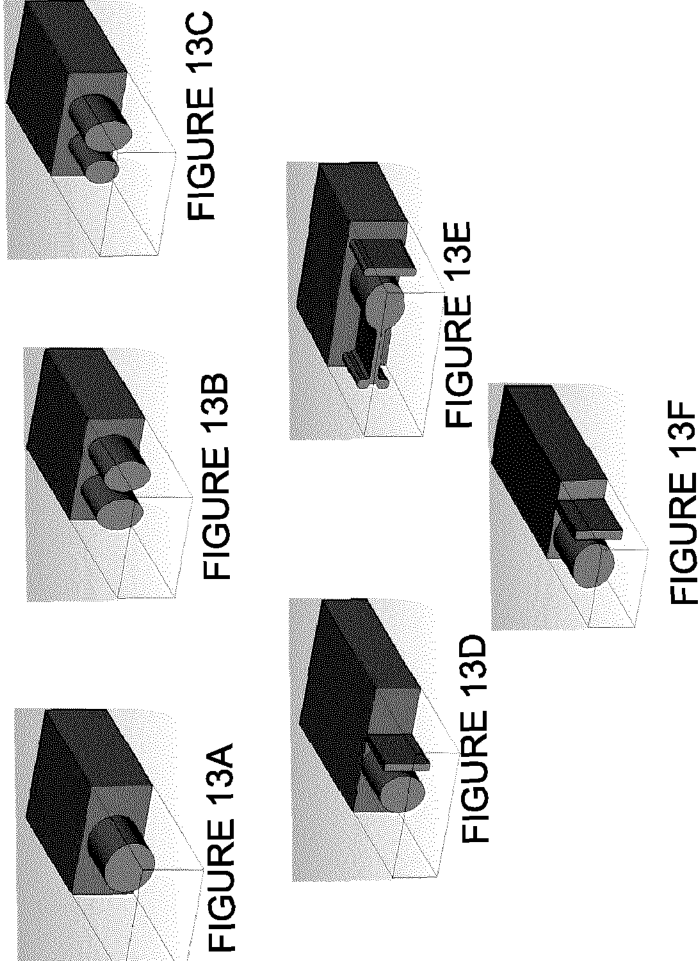
FIGS. 13A to 13F illustrates various examples of the grating element, in accordance with one or more embodiments.

FIGS. 13A to 13G illustrate various specific and non-limiting examples of the configuration of the grating element 104. FIG. 13A illustrates a symmetric beam splitter grating element 104 supporting guided modes for a normally incident plane wave. FIG. 13B illustrates a symmetric slot waveguide grating element 104 with two of the same dielectric waveguide components. When the grating element 104 comprises a waveguide 108 with multiple waveguide components, the electric field may be more concentrated in the void region and also propagates in that region, depending on various factors such as the thickness of the dielectric section and slot, refractive index of the material and the overall shape of the grating element 104. Accordingly, when the grating element 104 has a waveguide 108 with multiple dielectric elements with a gap or a slot in between the dielectric elements, the waveguide 108 may be referred to as a "void waveguide". The structure may behave more like a waveguide than a resonator, as any reflections from the horizontal boundaries of the waveguide 108 may be considered small. FIG. 13C illustrates an asymmetric slot waveguide grating element 104 with two different dielectric waveguide components to deflect a normally incident plane wave from the substrate side (or bottom end) to the direction of 55 degrees. FIG. 13D illustrates an asymmetric beam splitter grating element 104 for a normally incident plane wave with its electric field component along the diffractive period. FIG. 13E illustrates a polarization beam splitter grating element 104 for a normally incident unpolarised plane wave from the substrate side or bottom end. FIG. 13F illustrates an asymmetric slot waveguide grating element 104 to deflect normally incident plane wave, with its electric field component along the diffractive period, from the patterned side or top end to the direction of 40° into the substrate medium.

Figures 14A, 14B, 14C:
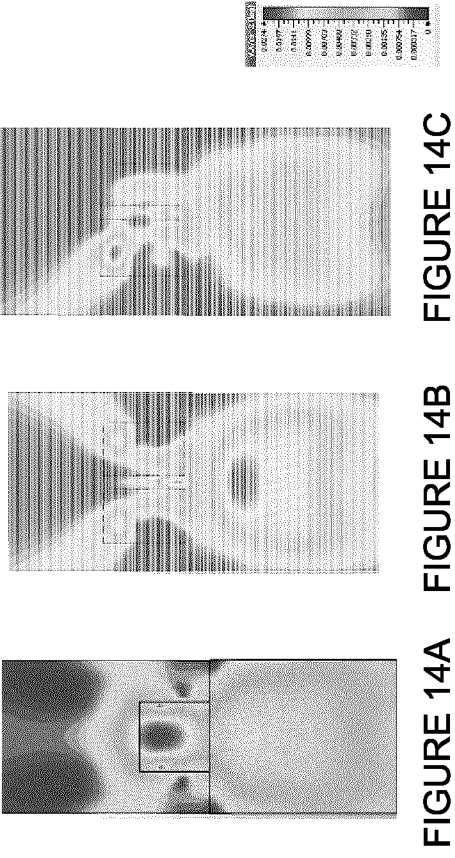
FIGS. 14A to 14C illustrate the Poynting vector distribute for the grating elements of FIGS. 13A to 13C, respectively, in accordance with one or more embodiments.
Figure 15A:
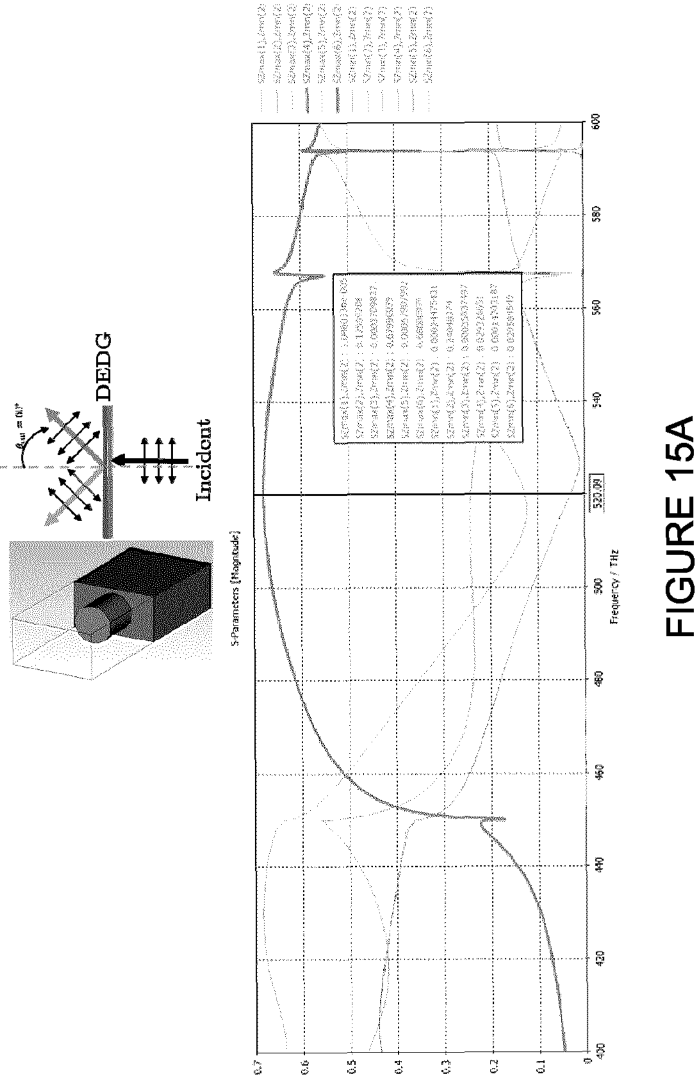
FIGS. 15A to 15E illustrate plots of transmission amplitudes for the grating elements of FIGS. 13A, 13D, 13E, 13C, and 13F, respectively, in accordance with one or more embodiments.
Figure 15B:
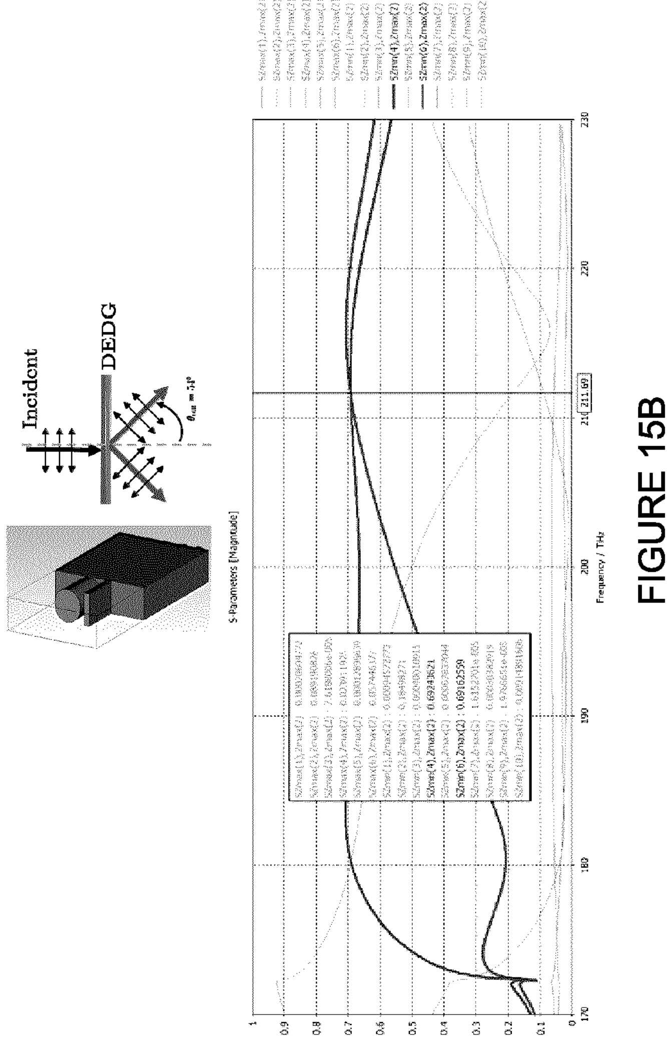
Figure 15C:
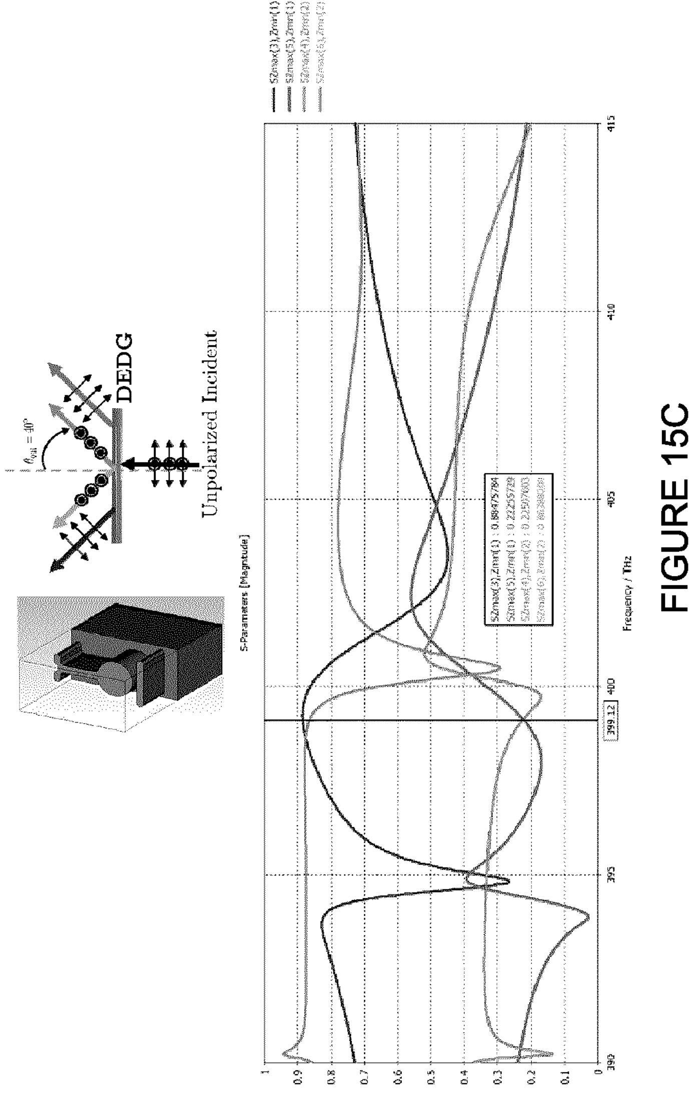
Figure 15D:
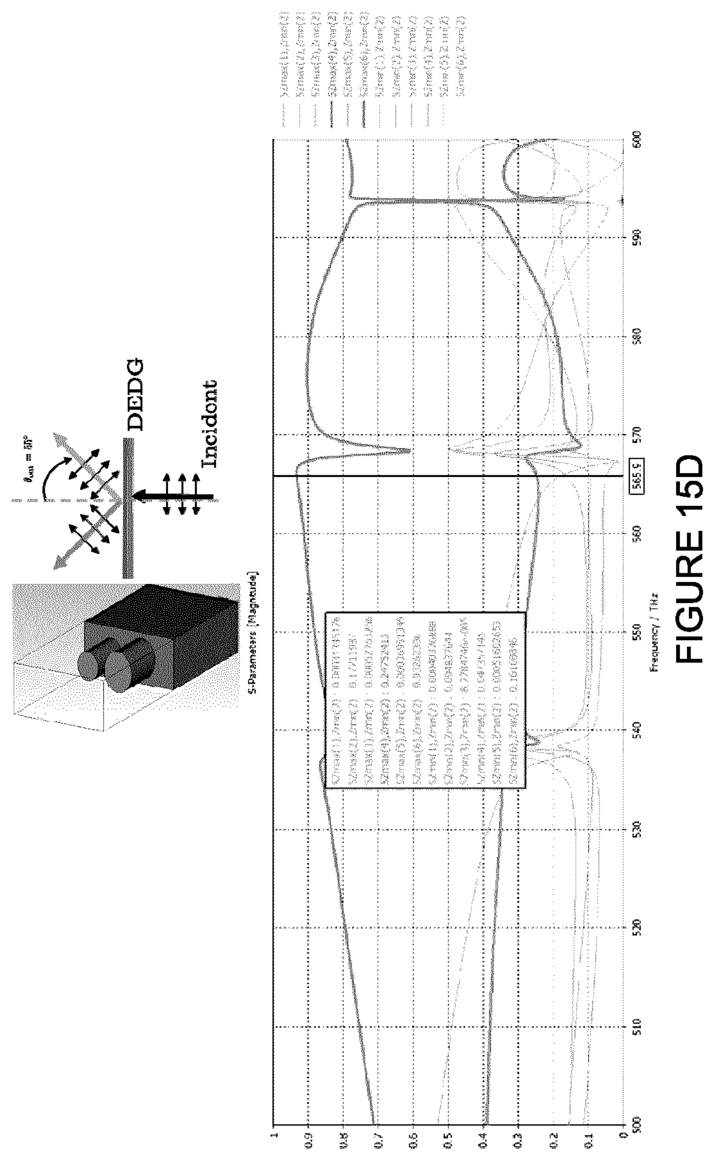
Figure 15E:
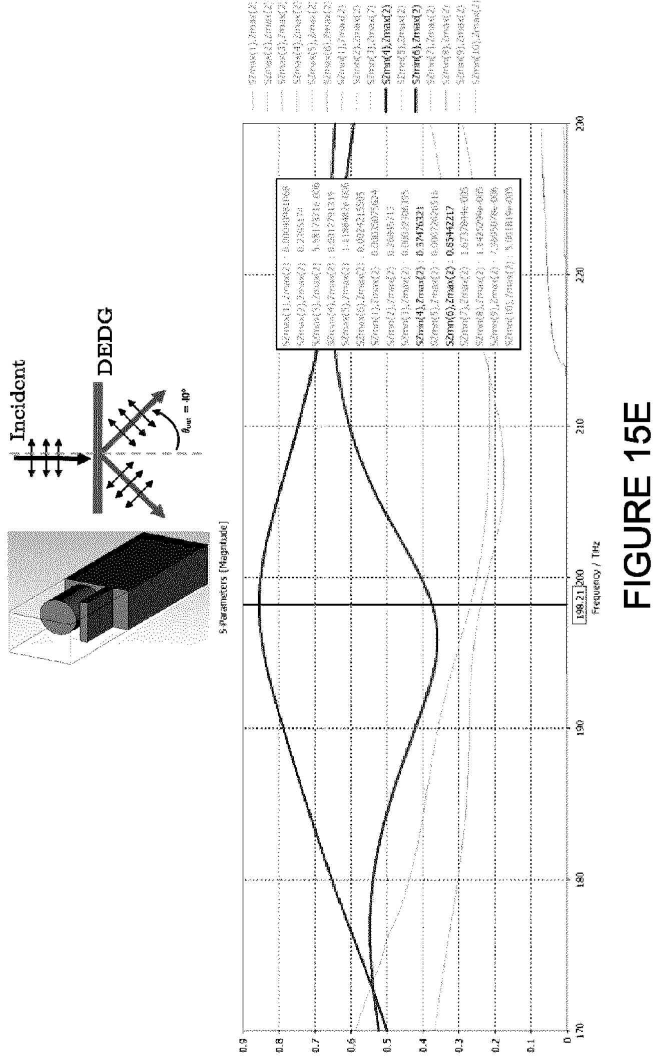
Figure 16A:
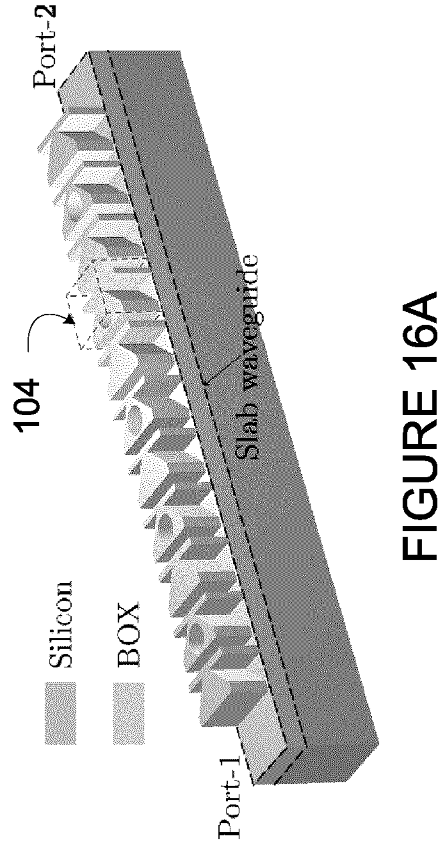
FIG. 16A is an array of asymmetric waveguides for coupling a normally incident Gaussian wavefront, in accordance with an embodiment.
Figure 16B:
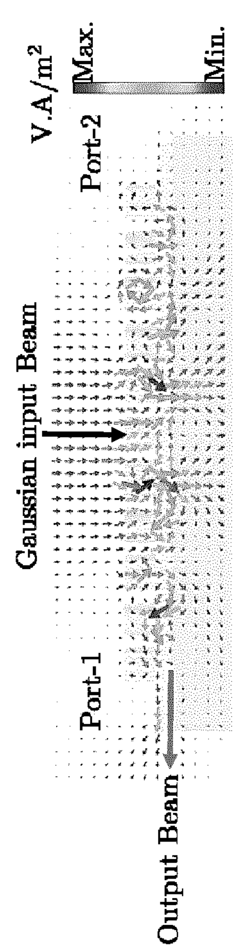
FIG. 16B illustrates the Poynting vector distribute for the array of asymmetric waveguides of FIG. 16A, in accordance with an embodiment.

FIGS. 14A to 14C illustrate the Poynting vector distribute for the grating elements of FIGS. 13A to 13C, respectively. FIGS. 15A to 15E illustrate plots of transmission amplitudes for the grating elements of FIGS. 13A, 13D, 13E, 13C, and 13F, respectively. FIG. 16A illustrates an array of asymmetric waveguides for coupling a normally incident Gaussian wavefront. In the example of FIG. 16A, both the vertically oriented waveguides and the horizontal waveguides are made of the same material. FIG. 16B illustrates the Poynting vector distribute for the array of asymmetric waveguides of FIG. 16A.

In one embodiment, a number of differences in the analysis and design of a waveguide 108 incorporated in device 100 described herein and a binary blazed grating or waveguide based metasurface-grating structures may be noted. First, in the case of a binary blazed grating, ideally all the incident power is guided through multiple waveguide elements in which the incident eletromagnetic wave excites only the first guided component in each waveguide. In contrast, in the case the device 100, an electromagnetic wave may excite two or more guided and/or radiative components. Second, the phase profile of the field inside the waveguide 108 may vary along a lateral plane. So for an appropriate height of the waveguide 108, required gradient phase profile can be realized from a single slot-waveguide. However, in a binary blazed grating, the phase profile of the field, along the height of the waveguide, is non-varying and therefore multiple waveguides with different propagation delays are required to realize a gradient phase profile. Third, grating elements in prior art devices may have omnidirectional radiation, whereas the grating element 104 described herein may radiate directionally (unidirectional radiation). Fourth, a grating height of $\lambda_0/(n_{max}-1)$ is required for binary blazed gratings, where the $n_{max}$ is the maximum effective refractive index of the thickest waveguide element. In contrast, the device 100 has an approximate height of $\lambda_0/2(n_{eff}-1)$, where $n_{eff}$ is the effective refractive index of the lowest order guided mode of the asymmetric waveguide and generally may be higher than $n_{max}$ due to its relatively higher thickness. This shows that device 100 may be fabricated with low aspect ratio structures.

Full-wave simulation results were performed for various configurations of the device 100 according to the various embodiments described herein. The simulation results support the claim that the single non-resonant or weakly resonant waveguide structure could efficiently deflect a normally incident light to large angles. A simulated efficiency of 91.64%, 92% and 94.4% was found for moderately large deflection angles of 50°, 53° and 45°. For very large angles such as 75° and 82°, simulated efficiencies of 73% and 50% were obtained for an asymmetric one-dimensional waveguide. It should be appreciated that, in one embodiment, the simple design of the device 100 may make the device 100 favourable for easy and large scale fabrication.

In comparison with the asymmetric one-dimensional device 100, the bandwidth of the asymmetric two-dimensional device 100 may be narrower due to the presence of one or more sharp resonance peaks. The sharp dip in the efficiency curves (in FIG. 9B at 588.5 nm) is due to the satisfied resonance condition for guided modes along the lateral plane of the grating structure. The non-diffractive period does not support any free-space propagating wave vector, however it can support an in-plane guided mode due to a smaller effective wavelength along that direction.

The incident angle sensitivity analysis shows that the structural efficiency may be stable for any change of incident angles along the −θ direction as shown in FIG. 8. Given that most of the energy is tightly confined in the sub-wavelength slot region, the response of the grating does not vary significantly with changes in the in-plane wavevector, $k_{||}$ of the incident beam. This is similar to the case of binary blazed gratings. In contrast, most dielectric resonator based metasurface-gratings show strong spatial dispersion and thus not suitable for variable incident angle.

In the examples described herein, there is no significant reflection from the scattering elements due to excellent overlap between the incident and the propagating filed through the diffractive element. However, for waveguides supporting multiple higher order modes, with effective refractive index values closer to the refractive index of the dielectric material of the waveguide, the reflections can become more important due to smaller overlap integrals with the incident plane wave. This may be exploited to realize reflection type or simultaneous transmission-reflection type gratings and allow for the independent control of transmission and reflection images, for application such as double phase holograms.

Accordingly, in one embodiment, described herein are grating structures that may be efficient for large angles and may be fabricated using very simple structures. The non-resonant or weakly resonant behavior of the device 100 makes it insensitive to variation in incident angle and the device 100 exhibits large operational bandwidth. The grating structures described herein show several advantages over metasurface gratings for simple beam steering and control. Traditional diffraction gratings technology is more mature and shows advantages over metasurface-gratings in terms of their ease of design and fabrication. However, traditional gratings lack the breadth of multi-functionality achievable using metasurfaces. The device 100 may be a bridging gap with flexibility and robustness in fabrication equivalent to traditional gratings, but functionality and wave engineering capability equivalent to metasurface-gratings.

The simulation results described herein are for light incident from the glass substrate side (refractive index n=1.50) and diffracted beams are in air (n=1). The grating elements are composed of $TiO_2$ with n=2.53. The $n_{eff}$ of the waveguide section is calculated from 2-D frequency domain solver in COMSOL Multiphysics™. The beat length and the height ($h_b/2$) is calculated for the initial design of the structure. The parameters of the waveguide are optimized to achieve suitable diffraction efficiency in CST Studio™ frequency domain solver using periodic boundary condition. The Poynting vector plots, field plots and the radiation pattern of individual scattering element are generated from the CST Studio™ transient solver with perfectly matched layer boundary condition.

Figures 17A, 17B:
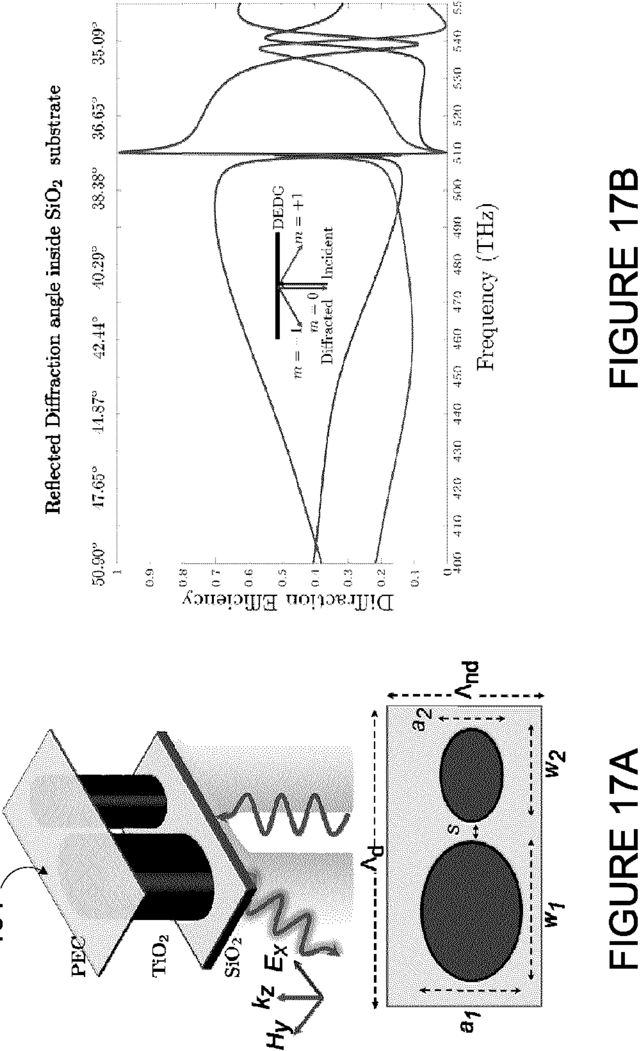
FIG. 17A is a perspective and top view of a reflection-type diffraction grating element, in accordance with an embodiment.
FIG. 17B is a graph illustrating diffraction efficiency as a function of frequency for the grating element of FIG. 17A, in accordance with an embodiment.

As shown in the FIG. 17A, the grating device 100 in some embodiments is a reflection-type grating device. A metallic reflector or a material with very high dielectric constant or an artificially designed metasurface has been added on the top of the grating element to reflect the incident light directionally. An array of plurality of such reflective element can realize a reflection type grating. FIG. 17B shows a graph illustrating diffraction efficiency as a function of frequency for the grating element of FIG. 17A.

Figures 18A, 18B:
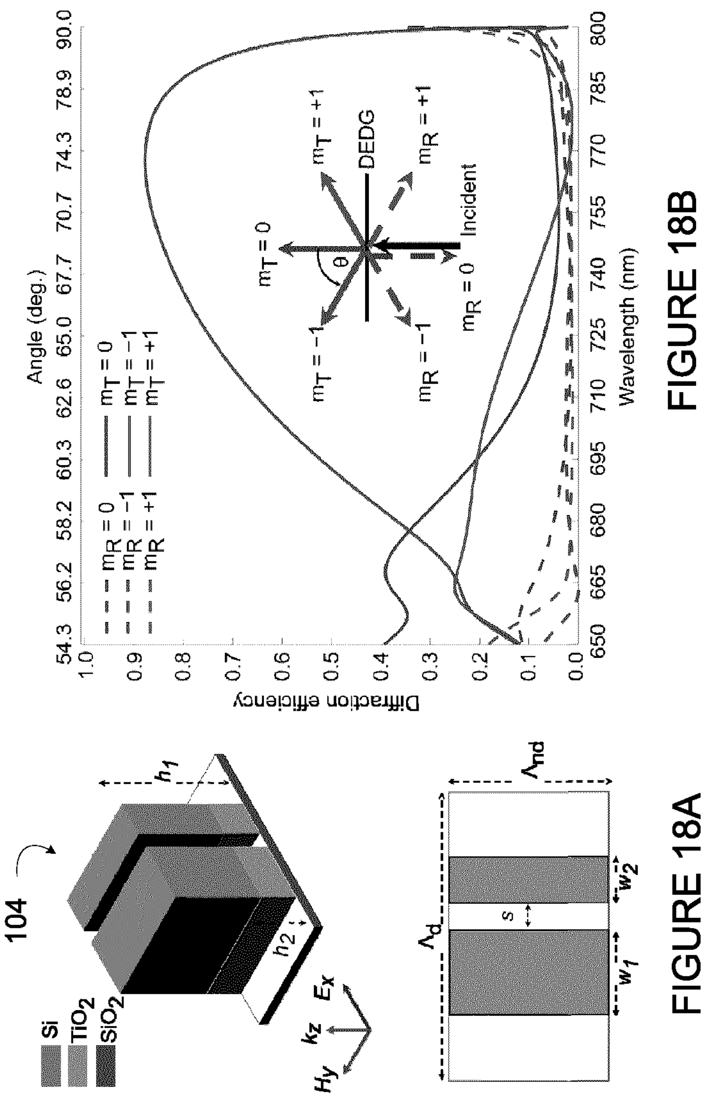
FIG. 18A is a perspective and top view of a multi-layer waveguide based transmission-type grating element, in accordance with an embodiment.
FIG. 18B is a graph illustrating diffraction efficiency as a function of wavelength for the grating element of FIG. 18A, in accordance with an embodiment.

As shown in FIG. 18A, the vertically orientated waveguide 108 may be made of multiple dielectric materials. The multiple dielectric materials may be stacked vertically or horizontally. In this case, a vertically stacked double-layer scattering element has been shown along with the diffraction efficiency of a transmission type grating comprising such scattering elements. FIG. 18B is a graph illustrating diffraction efficiency as a function of wavelength for the grating element of FIG. 18A.

FIG. 19A is a perspective and top view of a multi-layer substrate based transmission-type grating element, and FIG. 19B is a graph illustrating diffraction efficiency as a function of wavelength for the grating element of FIG. 19A.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the grating device may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A grating element comprising:

a substrate having a bottom surface and a top surface opposite the bottom surface; and a vertically-oriented light propagating element comprising at least one three-dimensional dielectric member extending vertically away from the top surface of the substrate, along a direction normal to the top surface, by a height equal to half of a beat length of the grating element, the at least one dielectric member configured to;

guide therethrough, along the direction normal to the top surface, an electromagnetic wave incident on the substrate from one of the bottom surface and the top surface thereof, and provide directional scattering of the electromagnetic wave in a radiation pattern caused by one of interference between at least two guided components and interference between at least one guided component and at least one radiative component, the guided and radiative components excited by the electromagnetic wave and propagating vertically through the at least one dielectric member along the direction normal to the top surface of the substrate, wherein the grating element is configured to be arranged in an array with a plurality of other grating elements to form an optical grating device having a diffractive period, the at least one dielectric element of each of the grating elements in the array being within the diffractive period.

2. The grating element of claim 1, wherein the at least one dielectric member is configured to provide directional scattering by diffracting the electromagnetic wave into at least one direction of at least one desired diffraction order and supressing undesired diffraction orders.

3. The grating element of claim 1, wherein the light-propagating element comprises a plurality of layers of dielectric materials.

4. The grating element of claim 1, wherein the substrate comprises a plurality of layers of dielectric materials.

5. The grating element of claim 1, wherein the light-propagating element is symmetrical and causes the grating element to provide directional scattering in a symmetric scattering pattern.

6. The grating element of claim 1, wherein the light-propagating element is asymmetrical and causes the grating element to provide directional scattering in an asymmetric scattering pattern.

7. The grating element of claim 1, wherein the light-propagating element is a slot waveguide comprising at least two dielectric members with a void region defined between two consecutive dielectric members.

8. The grating element of claim 7, wherein the at least two dielectric members of the slot waveguide are different.

9. The grating element of claim 7, wherein the at least two dielectric members of the slot waveguide are substantially the same.

10. The grating element of claim 1, wherein, for each grating element in the array, the at least one dielectric member has a width lower than the diffractive period of the grating device.

11. The grating element of claim 1, wherein the grating element is configured to be arranged in the array with the plurality of other grating elements to form the optical grating device having a non-diffractive period, further wherein, for each of the grating elements in the array, the grating element has a length corresponding to the diffractive period of the grating device and a width corresponding to a non-diffractive period of the grating device.

12. The grating element of claim 1, wherein, for each of the grating elements in the array, the width of the grating element is set to be a subwavelength of a wavelength of the electromagnetic wave incident on the substrate.

13. A grating device for transmission or reflection of incident electromagnetic waves in a desired direction, the grating device comprising:

a substrate having a bottom surface and a top surface opposite the bottom surface; and an array of grating elements, each grating element comprising a vertically-oriented light-propagating element comprising at least one three-dimensional dielectric member extending vertically away from the top surface of the substrate, along a direction normal to the top surface, by a height equal to half of a beat length of the grating element, the at least one dielectric member configured to:

guide therethrough, along the direction normal to the top surface, an electromagnetic wave incident on the substrate from one of the bottom surface and the top surface thereof, and provide directional scattering of the electromagnetic wave in a radiation pattern caused by one of interference between at least two guided components— and interference between at least one guided component and at least one radiative component, the guided and radiative components excited by the electromagnetic wave and propagating vertically through the at least one dielectric member along the direction normal to the top surface of the substrate, wherein the at least one di member of each grating element is within a diffractive period of the grating device.

14. The grating device of claim 13, wherein each grating element has a length corresponding to the diffractive period of the grating device and a width corresponding to a non-diffractive period of the grating device.

15. The grating device of claim 14, wherein the grating device is configured to allow selective scattering of the electromagnetic wave in desired diffraction orders and suppression of undesired diffraction orders, a number of the diffraction orders determined by the diffractive period of the grating device.

16. The grating device of claim 13, wherein the array of grating elements is periodic, with a length of the grating elements remaining substantially the same along the array.

17. The grating device of claim 13, wherein the array of grating elements is aperiodic, with a length of the grating elements varying along the array.

18. The grating device of claim 13, wherein the grating device is configured as a beam splitter.

19. The grating device of claim 13, wherein the grating device is configured as a polarization beam splitter.

20. The grating device of claim 13, wherein the grating device is configured as a grating coupler.

* * * * *